US009275236B2

(12) United States Patent
Bolignano

(10) Patent No.: US 9,275,236 B2
(45) Date of Patent: Mar. 1, 2016

(54) METHOD FOR SECURING A PROGRAM

(71) Applicant: Dominique Bolignano, Paris (FR)

(72) Inventor: Dominique Bolignano, Paris (FR)

(*) Notice: Subject to any disclaimer, the term of this patent is extended or adjusted under 35 U.S.C. 154(b) by 0 days.

(21) Appl. No.: 13/930,580

(22) Filed: Jun. 28, 2013

(65) Prior Publication Data

US 2015/0007333 A1    Jan. 1, 2015

(51) Int. Cl.
  *G06F 7/04*    (2006.01)
  *G06F 21/60*   (2013.01)
  *G06F 11/36*   (2006.01)
  *G06F 9/45*    (2006.01)
  *G06F 9/445*   (2006.01)

(52) U.S. Cl.
  CPC ............... *G06F 21/60* (2013.01); *G06F 8/443* (2013.01); *G06F 9/44589* (2013.01); *G06F 11/3608* (2013.01)

(58) Field of Classification Search
  CPC ..... G06F 21/60; G06F 8/447; G06F 9/44589; G06F 11/3608
  See application file for complete search history.

(56) References Cited

U.S. PATENT DOCUMENTS

| 5,963,741 | A  | 10/1999 | Horikawa |
| 6,292,940 | B1 | 9/2001  | Sato |
| 6,550,056 | B1 | 4/2003  | Mizumoto et al. |
| 7,124,407 | B1 | 10/2006 | Wallman |
| 2001/0037492 | A1 | 11/2001 | Holzmann |
| 2002/0046393 | A1 | 4/2002  | Leino et al. |
| 2003/0226060 | A1 | 12/2003 | Das et al. |
| 2004/0031025 | A1 | 2/2004  | Brisset |
| 2008/0162885 | A1 | 7/2008  | Wang et al. |
| 2009/0222792 | A1 | 9/2009  | Shanbhogue et al. |
| 2009/0276763 | A1 | 11/2009 | Gulwani et al. |
| 2009/0282289 | A1 | 11/2009 | Nori et al. |
| 2010/0070804 | A1 | 3/2010  | Bolignano et al. |
| 2010/0146624 | A1 | 6/2010  | Meyer et al. |
| 2011/0191761 | A1 | 8/2011  | Doyle et al. |
| 2011/0321002 | A1 | 12/2011 | Chen et al. |
| 2013/0055033 | A1 | 2/2013  | Frazier et al. |
| 2014/0245259 | A1 | 8/2014  | Bolignano |

OTHER PUBLICATIONS

File history for U.S. Appl. No. 13/777,524, filed Feb. 26, 2013. Inventor: Dominique Bolignano.
Search Report dated Nov. 19, 2014 for PCT Application No. PCT/IB2014/061753, 4 pages.

*Primary Examiner* — Krisna Lim
(74) *Attorney, Agent, or Firm* — Patterson Thuente Pedersen, P.A.

(57) ABSTRACT

A method for securing a first program with a second program, a third program and a fourth program, each program comprising constitutive elements having a finite number of program points and evolution rules associated with the program points and defining the passage from one program point to another program point, and each program comprising a definition of a set of properties each property being associated with one or more of the constitutive elements of the program. The fourth program constructed by defining at least one relation between at least one constitutive element of the second program and at least one constitutive element of the third program, said relation being named a correspondence relation, and at least one property of the third program being proven, propagate the proof of said property to at least one property of the first program by exploitation of the correspondence relation.

11 Claims, 11 Drawing Sheets

METHOD FOR SECURING A PROGRAM

TECHNICAL FIELD

The present invention relates to a method for securing a program as well as a computer software product implementing the method.

BACKGROUND OF THE INVENTION

By securing the program it should be understood that in this disclosure, the program is written in order to guarantee operating in accordance with the specifications or the operating constraints, or that some of its (local) properties (as defined below) are proven correct. Thus, for example, in an automatic controlling equipment of a system, such as a rocket, a train, etc., it is necessary to ensure that the program executes exactly within its operating range in order to prevent jeopardy of the system or the environment thereof.

This is particularly important in complex systems because these systems, owing to their complexity, are very difficult to analyze by specialists. This difficulty may be illustrated by the accident that occurred during the first flight of the Ariane V rocket, which after expertise, turned out to be due to a thrust engine control computer. In fact, the thrust engine control computer was programmed for the previous generation rocket Ariane IV that was less powerful with less strong accelerations. The transfer of this computer onto the Ariane V rocket without taking this new parameter into consideration led the latter to receive acceleration data, which triggered an unanticipated register overflow and a motor control malfunction. Thus, it is extremely important, for critical systems, that the execution domain as well as the execution within this domain to be perfectly defined, documented and verified.

The currently used techniques are mainly based on mathematical rules based on first-order logic, or high-order logic such as Coq. The currently used techniques consist in using specific programming languages with software tools which will attempt to prove, in the mathematical sense. These software programs are called, in the literature, "provers".

The operation of these provers fundamentally consists in transcribing the studied program into logical assertions (i.e. "proof obligations") to be proven. Another possibility is to use the logical language itself, such as Coq, in order to describe the programs, express the properties and prove, thus avoiding the need for transformation into logical assertions.

However, it appears that the complexity, in the algorithmic sense, of the search for logic proofs increases faster than the complexity of the studied program. In the case of a computer-assisted proof, it appears that the user finds it difficult to use the intuition he has for the good operating of the program, in order to guide the prover. These techniques thus, become very difficult and high consumers of time and resources when working on critical and complicated programs, such as control programs and/or complex system where security is involved. Thus, while the need has become more important and research teams have been working on this subject for at least 30 years, these proof technologies have remained in the laboratories or are used in extremely demanding sectors regarding operational security such as aero space or rail resulting in, e.g., in this case, a software architecture which makes it difficult, if not impractible, to cut these programs into sub-assemblies that can be managed by the provers.

It would be thus advantageous to obtain a method for securing a program which would be adapted for usage on complex programs. From now on, the term "proof" (or "formal proof") will be used as a synonym for "formal verification", i.e., verification based on formal methods in general, and the term "logic proof" for the specific case of proof in classic logic systems (predicate logic, higher-order logic).

SUMMARY OF THE INVENTION

In order to resolve one or several of the aforementioned drawbacks, in an embodiment, a method for securing a first program with a second program, a third program and a fourth program, each program comprising constitutive elements, said constitutive elements comprising a finite number of program points and evolution rules associated with the program points and defining the passage from one program point to another program point, and each program comprising a definition of a set of properties each property being associated with one or more of the constitutive elements of the program, said method comprises constructing the fourth program by defining at least one relation between at least one constitutive element of the second program and at least one constitutive element of the third program, said relation being named a correspondence relation; exploiting the correspondence relation for establishing a relation between one property of the first program and at least one property of the third or fourth program, said relation being named a "sufficiency relation" and being such that it creates an oriented relationship between one local property of a program, and one or more local properties of the same or another program such that the proof of the latter properties proves the first local property, or propagate the proof of said property to at least one property of the first program.

The first program can be referred to as the "target program", i.e. the target program to be secured by application of the method. The fourth program can be referred to as being the "correspondence program", i.e. the one being used to establish correspondence between the second and third program. The second and third program can be referred to as being the "elementary programs", even if in practice they can be as complex as needed or obtained as the composition of some other programs. The term "elementary program" refers more to the fact that the programs are elementary with respect to the correspondence program that establishes correspondence between their elements.

Thus, by using the path logic intrinsically included in the program, it is possible to structure and thus reduce the size and complexity of the expressions on which the prover will execute.

Characteristics or particular embodiments, as described throughout, can be used singly or in combination, as is apparent to one with skill in the relevant art.

In embodiments, the first program can be the second program or the fourth program, i.e. the second program is (plays also the role of) the target program, or the fourth program is (plays also the role of) the target program.

In embodiments, the fourth program can be the second program or the third program, the fourth program is (plays also the role of) one of the elementary programs.

In embodiments, the fourth program can be constructed automatically by applying synchronization rules between the second program and the third program.

According to an embodiment, a computer software product comprises software instructions for implementing the aforementioned method when said computer software product is executed on a computer.

According to an embodiment, a system for securing a first program with a second program, a third program and a fourth program, each program comprising constitutive elements, said constitutive elements comprising a finite number of program points and evolution rules associated with the program points and defining the passage from one program point to another program point, and each program comprising a definition of a set of properties each property being associated with one or more of the constitutive elements of the program, said system comprises a program builder for constructing the fourth program by defining at least one relation between at least one constitutive element of the second program and at least one constitutive element of the third program, said relation being named a correspondence relation; a prover exploiting the correspondence relation for establishing a relation between one property of the first program and said at least one property of the third or fourth program, said relation being named a "sufficiency relation" and being such that it creates an oriented relationship between one local property of a program, and one or more local properties of the same or another program such that the proof of the latter properties proves the first local property, or for propagating the proof of said property to at least one property of the first program.

BRIEF DESCRIPTION OF THE DRAWINGS

The embodiments of the invention can be better understood upon reading the following detailed description of various embodiments of the invention in connection with the accompanying drawings, in which.

Figure 1A:
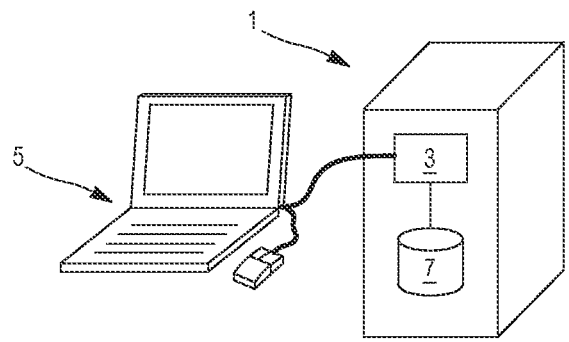
FIG. 1A is a schematic view of a computer system for implementing an embodiment of the invention.

While the embodiments of the invention are amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE INVENTION

As used herein, the terms "program", or "program to secure" or "program to prove" will be used to name the computer software being secured. The other computer software which participates in or executes the steps of the securing method will be called "software(s)" or "computer software(s)" or "software tool(s)".

In reference to FIG. 1A, a computer system 1 comprises means 3 for computing and memorizing as well as a human-machine interface device 5, typically of screen type, keyboard and mouse. It also comprises storage means 7 in the form of hard disks, solid disks or any other classic data storage means.

The human-machine interface is adapted to allow a user to give directives to a computer software running on this computer system 1 and view the analysis results provided by this software.

The human-machine interface 5 comes in the form of a program development environment with the associated tools. Thus, it comprises software of text editing type, parser, compiler, etc. The Eclipse environment, written in Java, is an example of such an environment.

Figure 1B:
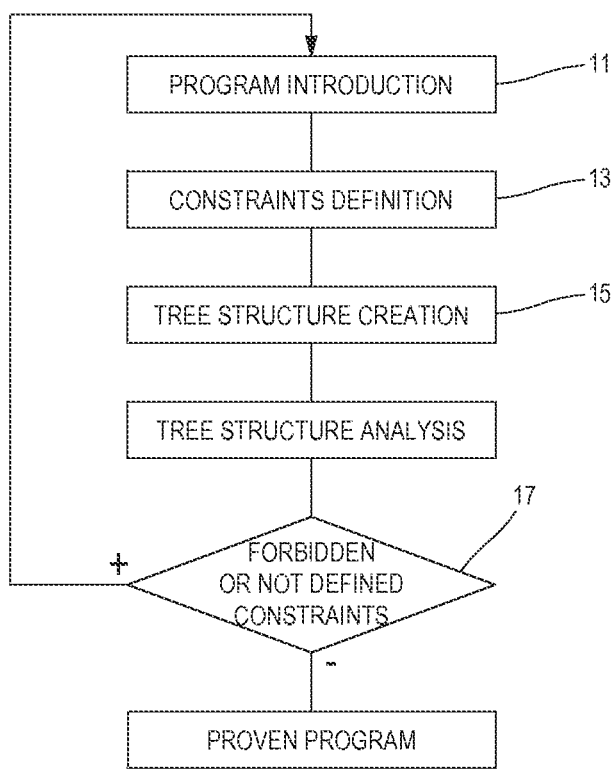
FIG. 1B is a flowchart for operating an embodiment of the invention.

Referring to FIGS. 1A and 1B, in a first step of the securing method, step 11, a program is introduced on the human-machine interface to a user. This program is classically introduced in the form of a text file containing instructions, or execution controls, sequenced in a high-level language. Although, as it will be presented hereinafter, certain languages are more adapted than others for implementing the securing method, the program could have been written in any normally used programming language such as C, C++, ADA, Java, PHP, Erlang, Python, assembler, etc.

In other embodiments, the method can be applied to programs written in more graphic languages, of state machine type.

The program is generally composed of a set of run commands, each command being typically associated with a program point. These commands are combined by means of structuring instructions, such as choices ("if . . . then . . . else"), loops ("while . . . do . . . "), etc. In embodiments, the structure can be graphically represented. The branches and their annotations associated to a program point may generally be considered as the evolution rules for the given program point.

In embodiments, this definition of a program makes it possible to have a recursive view: a first program to secure is used/referenced in a second program, etc.

For a program, sub-program or run command, operating ranges or execution constraints, as well as the associated branching, are defined in step 13.

A runtime constraint comprises defining a domain in which the program, command has a homogenous behavior. For example, in the simple case of a run command or program consisting in a division, two domains are naturally defined: normal execution and divisor equal to zero. Each domain is associated with a particular processing and defines a branching following this processing. For example, the normal execution will lead to the execution of the following command in the program in which this command is used according to "normal" structuring of the program whereas in the case where the divisor is equal to zero will lead to another type of branching, for example, to error, or branching towards a specific processing. Each runtime constraint and its associated branching thus define a path rule. This generally leads to defining programs having several exit cases. The thus defined program, if used in a second program, will hence have its exit cases associated to branchings in the second program.

These definitions of path rules may be carried out in different ways or embodiments.

A first way or embodiment comprises that the human-machine interface and/or the programming language of the program provide tools allowing the user to "manually" define these path rules.

The second way or embodiment comprises using libraries and sequence recognition software, which will automatically define these path rules. For example, this recognition software may search for the divisions contained within the program and apply the path rules thereto, such as defined above.

A third way or embodiment, which will be the most illustrated herein, comprises defining for each program or command a finite set of exit cases, such as to only have to choose the relevant cases upon using them (the others being called here impossible cases or branching), as well as the branching corresponding to the relevant cases.

At step 15, the logic tree structure of a sequence of cases is created and used for simplification or proof purposes. The tree structure is that obtained by following the processing execution order (case taken for a command or a program) and the associated branchings, the tree structure representing a set of execution traces or routes or as will be seen later on a set of logic traces, each logic trace representing a usually infinite set of execution traces corresponding to the same choice of cases (and branchings). Any other means of proof may be also used to prove the local properties or impossible branches.

In order to repeat the example of division, the associated tree structure comprises arcs representing the two execution routes: the normal execution and the error execution.

In embodiments, the tree structure is created by taking into account the program structuring logic. The advantage of this, with respect to a purely logic flattening is to substantially limit the tree structure complexity. If, for example, before the division, the program has a divisor test different from zero, the error handling program arc corresponding to the division by zero will not be generated, or may be deleted, as it is "impossible" to take.

In embodiments where the program comprises a loop, either there is an infinite tree structure, or the tree structure is created by defining an invariant on an execution trace by identifying the routes without loops and duplicating variables possibly modified by the loops. This makes it possible in this second case to create a tree structure as defined by a graph without loops.

Thus, it is advantageous that the human-machine interface device 5 makes it possible to define, or that the recognition software defines, an impossible transition between two sequences. In fact, this makes it possible to define a local property, that is to say, the fact that the transition in this execution place of the program is not possible, and moreover allows reduction of the tree structure considering that it is not necessary to develop "impossible" arcs. Likewise, in various embodiments, it can be expressed and proven that a transition is impossible, it can be declared and proven more generally that a sub-graph is impossible (that is to say that it cannot be used), and the program can be annotated of more classical local properties (for example, Floyd-type) that must be proven.

In the embodiment of the division, it is interesting that a user interface makes it possible to define, or that the recognition software defines the entry conditions of a fragment of a particular program in order to limit the execution domain(s) of said fragment.

At step 17, in an embodiment where there are properties that remain to be proven, particularly branches declared impossible and non-proven, the method returns to step 11, either to complete the execution paths which were not defined, or modify the logic of the program so that the forbidden modes cannot occur.

In order to carry out this tree structure analysis, a prover should use the created tree structure to propagate constraints at program points and use transitive closures and properties of congruence or functionalities for deleting useless branches and bring, or contribute to, the formal proof of the smooth operating of the program.

In embodiments, for the program to be completely secured, it is necessary to demonstrate/show that for each transition of the graph that has been declared as "impossible" the transition can never be taken in the execution of the program, whatever the execution conditions. Analyzing routes leading to the "impossible" transition at stake can typically be a way of proving this. If other, more classic local properties, such as invariants, are used, they should naturally be proven too.

In embodiments, when a first program has already been secured or proven, if the program to secure may be modified by constant semantic transformations such as to reproduce the structure of the first program, then the proof of the first program is propagated to the program to be secured. This may be particularly used in the aforementioned recognition software. Besides, and more generally, it is not essential that two programs be equivalent in order to use one for the proof of the other. More loose properties may be used for this purpose.

In order to better understand the operating of this computer software and the implementing method, examples will now be used.

1. Introduction of a Descriptive Language

In order to facilitate the comprehension, an algorithm description language called SM will be introduced. It makes it possible to easily express the different elements implemented by the embodiments. However, it is worth noting that, in embodiments, any computer language can serve as a basis for the implementation of the invention.

The embodiments described hereinafter, although they will be mainly illustrated with the SM language, are intended for programs written in very diverse languages or formalisms, whether it be, for example, implementation languages, logic or specification languages, graphic languages. It is simply supposed that the SM language may be provided with semantics under certain conditions, for example, operational semantics when the program is executable, but the SM language may also typically also have logic traits, for example, universal or existential quantifiers. However, embodiments of the SM language are neither introduced nor used here. It should be simply and generally supposed that formal descriptions (language or formalism) can be transformed into an annotated graph such as described hereinafter (paragraph 2.1) and potentially exhibiting "forks" and "joins" making it possible to describe the parallelism and/or the concurrency. For the sake of simplicity, the combination with logic quantifiers will not be illustrated here and SM synchronization and parallelism primitives will not be introduced.

As an example, the subset of the SM language is illustrated here using a few primitives of a FIFO queue, which is called "seq".

In an embodiment, consider the program "member" defined in this sequence:

```
public member(elt x, seq e)
program -> [false]
[true:false, found :true]
{
1 :   f :=e ;
      while
      {
2 :       [empty :exit]removeFirst(y+,f,f+) ;
3 :       [true:found,false :true](x=y) ;
      }
}
```

The program "member" searches for a value element "x" in sequence "e" and returns "true" if it finds the element and "false" in the opposite case. The program "member" starts by placing the value of "e" in variable "f", then scans "f" using a loop in the search for the first element having the sought value.

Exit Cases

The program normally terminates by the exit "true", which is by convention the main case, if the element is found, and by the particular exit "false" in the opposite case. All programs have an implicit "true" exit, and may, in addition, (and it is a particularity of the language) comprise as many particular exit cases as is necessary. These exit cases can be assigned any name and is not limited to any one name. The case called "error" is restricted for describing the presumed impossibility of an exit or a branching as will be seen hereinafter. The exit cases list (other than "true" which is implicit) are listed in the program signature. Here, the list only includes one element, "false".

The program "member" thus comprises a finite number of program points (here the points called/labeled 1, 2 and 3. Also, no real syntax is introduced in this document for such naming/labeling of program points).

Axiomatization of Implicit Programs

In order to parse the sequence, the program "member" uses "removeFirst" which removes the first element of the sequence to return to the variable "y" and the resulting sequence in the variable "f". "removeFirst" is also a program (or predicate) and it has been used in the definition of another program "member". It is defined as:
public removeFirst(elt x+, seq e, seq f+)
implicit program→[empty]

The key word « implicit» indicates that the definition of the program is implicit (axiomatic in a certain manner), and hence does not contain an explicit body such as the previous program « member» . By default a program is explicit and contains a body.

This program hence distinguishes between two cases, the implicit case "true" and considered to be the main case, and the particular case "empty". Intuitively when the sequence is empty, and that no element may be removed from the sequence, the "removeFirst" call leads to the case and hence to the exit "empty".

Entry and Exit Variables

The "removeFirst" program has an entry value placed/associated with variable "e", and two exit variables "x" and "f", identified by the following "+". As is standard, and unless otherwise indicated (not presented here), the exit variables are only assigned and significant in the main case "true". Hence, as a rule in the case "empty" neither "f" nor "x" are assigned, and their values cannot be used in the rest. A later use of "f" will implicitly use the entry value which will not have been modified. An attempt to use "y" (for example, in loop exit) will be analyzed by the support tool as illegal as in certain routes, in this instance in a loop exit case in the first entry, the value of "y" will not have been bound.

The program is by default deterministic and sequential (if it was non deterministic, or if its execution model comprised, for example, possibilities of back tracking or parallel execution with or without communication primitive, it would be specified with key words or additional annotations, or even written if necessary by means of a specific execution machine.

Renaming Exit Cases

The part between brackets before the predicate "removeFirst" in its usage in the program "member" is a renaming descriptor (in this instance [empty:exit] which makes it possible to describe how case labels are renamed and hence define how the different cases are "branched". Such a renaming descriptor may appear in front of a program call, as well as practically in front of any encompassing syntactic structure, and in particular, in front of a program block. In this example, there are two others, one in front of the main block ([true:false;found:true]), and [true:found] in front of the equality (x=y).

By default "true" is branched to the following instruction, or more generally is branched so as to allow the "normal" flow provided by the syntactic context: at the end of the loop "while" the "normal" flow is to return at the start of a loop, at the end of the program the "normal" flow is to terminate the program in the "normal" case, that is to say, the case "true". A loop "while" terminates by building when the case "exit" is raised during the execution of the inside loop. It is thus renamed "true". Hence, in a certain manner, the part between brackets (when it is mentioned explicitly) describes the manner in which the cases should be renamed in order to deduce the branchings to be carried out. Here, in the case of a "removeFirst" exiting on the case "empty", the latter having been renamed "exit", the corresponding transition, that is to say, the case "empty" of "removeFirst", branches the flow of the program right after the loop. This loop being at the end of the program, the program terminates in this case by a case "true" itself renamed "false". This intuitively corresponds to the case where the sought element has not been found. In the opposite case, one is in the case "true" (that is to say the equality located in 3, responds "true", renamed "found", itself renamed "true").

Typically "f:=e" is syntactic sugar for describing "equals (e,f+);" with:
public equals(seq a, seq b+)
implicit program
Likewise « x=y» is syntactic sugar for « equals(x,y)» with:
public equals(elt a, elt b)
implicit program→[false]

In the first case the program « equals» associates to « f» a value equal to the value of « e» (in fact a congruence undefined here), and in the second case, it checks whether the two values (from "a" and from "b") are equal.

Hence, the renaming of exit cases of a program (or subprogram) is the main manner provided in SM to allow the user to describe the branching between program points, according to the cases taken.

Logic Traces

Generally, the SM language uses Prolog like variables. If any route is taken in the program (route taken by the program in the flow of execution), by adding the logic annotations associated to the transitions (and potentially to the states) "logic execution trace" can be obtained. Typically, new variable names will be generated by using a new variable name each time a "+" is encountered during the execution of the program, so as not to have any naming conflicts between the variables encountered several times and modified during the path. For example, the logic trace "equals(e,f+); removeFirst (y+,f,f+); equals(x,y);" may be represented as the logic trace.
equals(e0,f1+);
removeFirst(y1+, f1, f2+);
equals(x0,y1);
which has the advantage of having program variables that never change value ("single assignment" variables) and which hence may be considered very naturally as logic variables. An implicit program is able to have several exit cases, each case associated to a predicate (or a relationship). Obviously, here they are implicitly the cases "true" of the programs "removeFirst" and "equals" which are supposed to have been used in the examples. Generally, each return case of a program corresponds to a predicate (or logic expression, or relationship) that will be named here by convention by combining the program name with the exit case, thus, the sequence of predicates corresponding to the previous logic trace will be:

[true] equals(e0,f1+);
[true] removeFirst(y1+,f1,f2+);
[true] equals(x0,y1);

This logic trace may also be represented by notation (n) [true]equals(e0,f1+)→(1) [true]removeFirst(y1+,f1,f2+)→(m)[true]equals(x0,y1)→(o), where "n", "1", "m", and "o", are program point labels, with the last one, i.e. "o" being potentially and exit label. For conciseness, the logic trace can be identified whenever appropriate by omitting some or all of the predicate and parameters names, such as in (n) [true]→(1) [true]→(m) [true]→(o).

Whenever (n) designates an (or the) entry point of the program, the present trace describing a route from the entry of the program to any point in the program is called prefix. In the case when it is important to know if the trace is traversing (going from a start point to an exit point we will use the term "complete trace"). Thus, each command/program may be associated with a set of predicates potentially of different parities, a predicate being associated to each case, except the case "error". Another example of trace may be:

[true] equals(e0,f1+);
[empty] removeFirst(f1);

Typically, then « [empty] removeFirst(-,f1,-); » is none other than « [true] empty(f1)» where "empty" is the predicate/program, with two cases, « true» and « false» :

public empty (seq e)
implicit program→[false]

Of course, each logic trace (complete or not), and each prefix will generally correspond to a generally infinite set of execution traces. These execution traces will correspond to instancing of logic traces with domain values satisfying the logic constraints. Complete traces may be considered according to the need as in the two previous examples (complete traversal of the program) or corresponding prefixes which model the execution of the program from its beginning (activation) until any point where the program is not necessarily terminated. In the SM language, the two are considered (the second particularly make it possible to describe the semantics of the programs which do not terminate, for example, servers, and the programs whereof the execution model may include backtracking without however using infinite traces). However, this has no relevance for the invention described here. Likewise, infinite traces may be, for example, considered.

When a finite logic trace is used, it is quite easy to associate a logic expression to that trace: this logic expression is obtained as the conjunction of predicates encountered along the trace that specifies the constraints that must be respected by the values of the variables during the execution. For example, along the trace:

[true] equals(e0,f1+);
[true] removeFirst(y1+,f1,f2+);
[true] equals(x0,y1);

The conjunction is: « [true] equals(e0,f1)« [true] removeFirst(y1,f1,f2)« [true] equals(x0,y1)» . Here, the symbols « +» are unnecessary provided that the semantics of a case does not depend on the usage of entry or exit variables: the case « [true] equals(e0,f1+)» generates a value "f1" which satisfies by definition the predicate "[true] equals(e0, f1)» , where the second command is an equality test on two values provided in entry. This convention is not necessary, but allows for the simplification of the presentation and will be used in the rest.

Furthermore, it is noted that the predicates associated to each case characterize the evolution relationships between the program points, which they link. Thus, for example, starting from point 2 of the program "member" there are two possible evolutions materialized through the two cases "true" and "empty" of the command/program "removeFirst". The first characterized by the relationship associated to the predicate « [true] removeFirst(y1+,f1,f2+)» (that is to say, the relationship that associates a sequence "f1" to the pair constituted of the first element "y1" of "f1" and the sequence "f2" constituted of elements « f1» following « 1» in « f1» ) and leading from point 2 to point 3, the second « [empty] removeFirst(_,f1,f2+)» , (that is to say, the relationship that associates an empty sequence "f1" to empty sequence "f2") leading from point 2 to the "false" exit (or to the point towards which this exit is branched in the case of a use of "member" in another program).

In embodiments, the use of a logic trace is a manner of using the tree structure of the program. The logic traces although, defined here in the context of the SM language, may be transposed and defined formally in more general languages, typically by induction.

In embodiments, logic trace (or prefix) is also a specific case of program, a program without loop and with mono branching. This is to be considered as such throughout the document. Of course when considering some logic traces of a given program, it is not necessary for the tool to reformat and implement them as standard program.

Preconditions and Invariants

Let us now consider the program "remove", the purpose of which is to remove one and one instance only of "x" in sequence "f":

```
public remove (elt x,seq e, seq f+)
pre member(x,e) ;
program
{
    empty(f+) ;
    invariant member(x,e) ;
    g :=e ;
    while
    invariant member(x,g) ;
    {
        [empty :error]removeFirst(y+,g,g+) ;
        [true :exit,false :true] (x=y) ;
        addLast(y,f,f+) ;
    }
    while
    {
        [empty :exit]removeFirst(y+,g,g+) ;
        addLast(y,f,f+) ;
    }
}
public empty(seq e+)
implicit program
public addLast(elt x, seq e, seq f+)
implicit program
```

This example illustrates, first of all, the preconditions. Here, this program does not describe an applicative relationship (that is to say, that the function which associates "f" to "x" and "e" is not a total function). In order to remove one and only one value element "x" the program "remove" needs to be applied to a sequence which contains at least an element having this value. This example also illustrates the use of an invariant, a first program invariant (useless here), then a loop invariant which must be true at each passage in the loop. Invariants in the SM language may be programs in all their complexity. They can in particular introduce and modify specific variables of the invariant as well as use the variables of the program. An invariant is "true" if its evaluation returns the label "true".

Impossible Transitions

At last, the particular branching towards "error" is introduced. This label is used to describe impossible branchings (and, hence transitions). For example, in the definition of "remove", above, such a label is used at a place where it is known that the set cannot be empty, and that it is always possible to extract the first element (the "empty" case of the first "removeFirst is impossible). When it is used in a program, such as in the aforementioned "remove" example, it signifies the need to express and hence proves that the transition is impossible. Here, intuitively, the branching is impossible as "g" contains at least an element of value "x" as expressed by the loop invariant and, hence, cannot be empty. Further on, it will be seen that programs can also be used to axiomatize a property that is considered to be true by hypothesis. When the branching "error" is used in such a program used as axiom, it means that the branching is supposed to be impossible.

Axioms, Lemmas, Theorems

An SM expression provided with such constraints (impossible transitions, preconditions) thus expresses properties. In this regard, it can be considered according to the case as a "theorem", in this case a program to prove, a "lemma", that is to say an intermediary program which will have to be proven and then can actually be used for the proof of another program, or finally as an "axiom", that is to say a program that is supposed true, and which will allow, for example, to axiomatically define the respective behaviors of the programs whereof certain are implicitly defined. In the following section the usage of programs as axioms will be illustrated.

The use of label "error" in the axioms is illustrated here, in this case for the definition of the two following axioms which allow for the axiomatization of the three implicit programs, "removeFirst", "addLast" and of the first version of "empty" (that of signature "empty(elt x+)"):

```
program // Axiom1
{
1 :   empty(e+) ;
2 :   [true:error]removeFirst(x+,e,e+) ;
}
program // Axiom2
{
1 :   addLast(x,e,f+) ;
      while
      {
2 :       [empty :exit]removeFirst(y+,e,e+) ;
3 :       [empty :error]removeFirst(z+,f,f+) ;
4 :       [false:error](y=z) ;
      }
5 :   [empty :error]removeFirst(z+,f,f+) ;
6 :   [false:error](x=z) ;
7 :   [true:error,empty :true]removeFirst(z+,f,f+) ;
}
```

Here, intuitively, for example, in the first axiom the branching is impossible as "e" contains an element, the one that has just been added. The first axiom may be written in an equivalent manner:
empty(e+); =>[true:false,empty:true]removeFirst(x+,e,f+);

This allows partial introduction of the construct « => » of the SM language. The construct makes it possible to limit the context in which an instruction is executed. If the premise terminates normally, that is to say with "true", then the first instruction of the conclusion is branched on, then the conclusion is "executed" normally. If it is negative, the conclusions are not executed. This may occur in the case where the premises return the case « false », « error » or any other label. In the first case by convention, the implication returns "true", in the two other cases the label is returned without renaming.

Programs as Theorems

Figure 2:
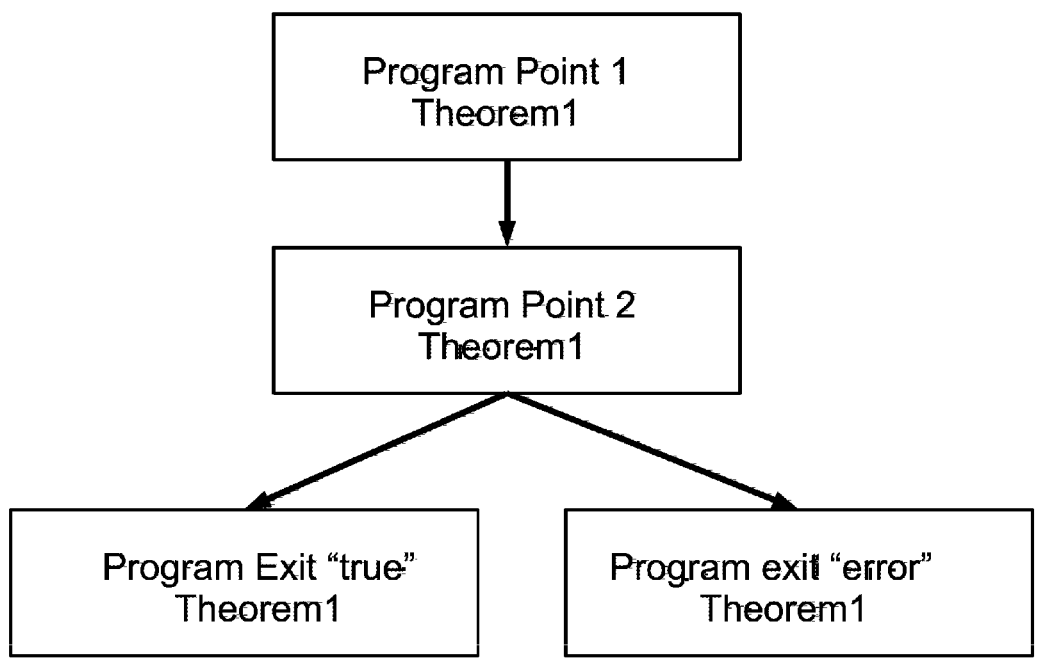
FIG. 2 is a flowchart of constraints for example "Theorem1"

Typically, one may then want to deduce axioms from the two following theorem programs (that is to say, the two following programs)
//Theorems
Theorem1 (for example, referring to FIG. 2): addLast(x,e,f+); =>member(x,f);
Theorem2: member(x,e); addLast(y,e,f+); =>member(x, f);

2.0 Partial Functions Versus Total Functions

The SM language makes it possible to choose, to use commands or programs which are total or partial functions. The first definition of "remove" above is a partial function, thanks to the usage of a precondition. However, a total function could have been used without losing the separation in an exit case required by the user, as in the following new definition:

```
public remove (elt x,seq e, seq f+) ->[notin]
program
{
    empty(f+) ;
    g :=e ;
    while
    {
        [empty :notin]removeFirst(y+,g,g+) ;
        [true :exit,false :true] (x=y) ;
        addLast(y,f,f+) ;
    }
    while
    {
        [empty :exit]removeFirst(y+,g,g+) ;
        addLast(y,f,f+) ;
    }
}
public remove (elt x,seq e, seq f+)
program
{
    empty(f+) ;
        g :=e ;
        while
        {
            [empty :exit]removeFirst(y+,g,g+) ;
            [true :exit,false :true] (x=y) ;
            addLast(y,f,f+) ;
        }
        while
        {
            [empty :exit]removeFirst(y+,g,g+) ;
            addLast(y,f,f+) ;
        }
}
```

This second definition adds a case to the first to make it total. The third adds a processing, which makes the function total, but by changing its semantics. The third program removes the first instance of the element having a given value, if it exists, and otherwise it simply copies the sequence.

A similar example with the classic case of the division would be:
public divideBy(x,y,z+)
pre nonZero(y)
implicit program
public divideBy(x,y,z+)→[zero]
implicit program
public divideBy(x,y,z+)//deterministic or undeterministic value to be defined for y=0 implicit program
Intermediary Representation The SM language may be rather easily and naturally converted into an internal representation, here called SMIL, which represents a finite graph composed of a finite set of states/nodes (program points in SM, whereof certain ones may be entries or exits of the program), and a finite set of oriented arcs linking some of these nodes. This SMIL representation is then a manner of describing more directly the evolution relationships between program points. Each node represents a program point and is associated to a finite set of variables (that is to say variable names). Each program arc represents a case that can be labeled with a proposition on the node variables (for the node label) or a proposition connecting the variables of the two nodes linked by the program arc. For example, in the first defined program, ("member"), a node can be associated by command or called sub-program (it is the point preceding the predicate call, then the two exit points, one corresponding to the exit "true" and the other corresponding to the exit "false"). For example, the node corresponding to the call of the command "removeFirst" (the point placed just before the call), it is typically the entry point of the loop and looping (the end of the loop will reloop on this point). Starting from this point are two arcs. One corresponds to the case "true" of the command and will point to the following point (that is to say the point preceding the call of the equality test). This arc will be labeled by the predicate "[true] removeFirst(y+,f,f+)" where "f" represents by convention the variable "f" of the start state (of the point/node) of the program arc, and "f+", and "y+" represent by convention the variables "f" and "y" of the destination state of the program arc. The other program arc is that corresponding to the case "empty" of the command and points towards the exit "false" of the program "member" (corresponds to case "false" of the program being defined). This program arc is labeled by the predicate « [empty] removeFirst(–,f,–)» which is found to be by definition equivalent to "empty(f)". In this example, only the arcs are annotated. Simple invariants (classic, Floyd) would correspond to predicates associated to nodes. In the case of SM language even if simple invariants are allowed, here program invariants are used, represented by bits of programs (sub-graphs) rather than the properties of the nodes.

Although it is not strictly necessary to generate or use such an intermediary language for the inventions presented hereinafter, it is a very convenient manner for implementing them.

As for the variables associated to the nodes in the graph, they are typically determined automatically in the case of SM by analyzing the program based on the variables provided in parameters and by a fixed point mechanism (variable "intensity" analysis). This analysis may identify certain incoherencies, which must be corrected in the definition of the program, for example, that a variable is used while it has not been initialized in certain routes that may lead to a considered point.

Furthermore, more generally, other forms of annotations or arcs (or even nodes) may be considered, for example, sets, relationships and these could be represented by intension or extension.

1.11 Parallel Programming

The embodiments introduced hereinafter although presented on sequential and deterministic programs, are more general, and are also applied to highly diverse execution models, particularly parallel, concurrent programs, non deterministic programs or subjected to "back-tracking" possibilities. At the intermediary language SMIL some of these possibilities may be easily presented by introducing "fork" and "join" mechanisms in the graph. Based on a node, there are always several possible cases, but each possibility instead of being a simple program arc may be a finite set of arcs (a fork). Likewise, instead of only having one finite set of arcs able to reach a point, there can be a set of possibilities, each being a simple program arc or a finite set of arcs, a "join", thus leading to a structured program arc. A path in the graph being no longer simply a route (that is to say, a total order of states which succeed each other in time), but a partial order, that is to say the execution traces, but also the corresponding logic traces, becoming as is generally known partial orders. Furthermore, the program arc annotations become more complex. Rather than apply to a simple program arc they apply to more complex configurations between the nodes before and after corresponding to a case. However, as before, these properties can be expressed on neighboring nodes (in the partial order). Each route or sub-route in the graph generally corresponds, not to a total labeled order of nodes, whereof the nodes and arcs are annotated by predicates, but similarly labeled partial orders. In this instance, it makes it possible in this instance to support highly diverse synchronization mechanisms at the SM language level, the only constraint being to know how to transform the description into a SMIL graph. Typically, a synchronization will be translated as a "join" followed by a "fork" joining then releasing the programs that are synchronized (two or several). For the sake of simplicity, SM synchronization and parallelism primitives are not introduced. Furthermore when in the rare cases where such primitives will have to be used in this document, it will be done at the SMIL intermediary representation, where solely primitives "fork" and "join" allow for a sufficient expressiveness. Hence, at this stage the notion of program can be generalized. A program will thus be defined as a finite set of points linked by a finite set of transitions, provided with one or several entries (only the single entry case is illustrated) and one or several exits. The points may be annotated with logic properties characterizing the states associated to the point, the transitions may also be associated to logic properties describing the relationship linking the states corresponding to the points it connects. When the program describes a sequential program this last relationship describes how a state of the start point is linked to the state corresponding to the end point. When the program describes a parallel program with or without synchronization the states are typically tuples describing the state of the process being executed in parallel, and the relationships describe the partial order that links the tuple from the start point of the transition towards the tuple of the end point of the transition. But the program points can alternatively be considered to be the local points in which cases some transitions will be linked (in the case of "fork" or "join" the forked branches or the joining branches are linked). The convention taken here has an impact on the evolution rules themselves, and the tree structure derived from the program, but not on the applicability of claims.

1.12 Scission/Branching

Thus, by providing the information technology means, using characteristics of the description language (programming or specification language) and equipment (that is to say, "computer software") which supports it, in order to assist the user of the environment to split a command, or a referenced program (that is to say a program that is called based on another one) into a finite number of cases, each corresponding to a processing case. These different case may each lead to a different branching including potentially the branching to "error" (which of course does not exclude that all or part of the cases lead to, that is to say are branched, towards the same point), particularly in a manner to (a) reduce or delimit the "scope" of a command or sub-program in one or several of its usages, or (b) be able to identify and utilize the combinatorics or successions of impossible cases. For example, by way of illustration of (a), it is worth noting that at line 2 of the axiom2 it is considered that a restricted instruction, which always removes the first element, is used. This operation can only be applied to a sequence containing at least one element. This program hence infers a local constraint at point 3. Furthermore, by way of illustration of (b), it is worth noting that if a logic is considered leading from the start of the program to point 3, the combinatorics of the transitions leading to this point is incompatible with the transition which would cause the branch "empty" of the following removeFirst to be taken.

In practice, for example, it is possible to identify beforehand the possible cases to expect for a command or a subprogram, such that the tool assists the user in selecting or managing the choice of the cases to retain (not necessarily all which would also create in itself a constraint) and potentially the manner of associating the selected cases to the control structure of the program during usage. This is what the SM language naturally allows for. Typically, the equipment will make it possible to ponder on the case breakdown, and particularly the cases to use. By way of example, here the implicit definitions of "removeFirst", and "divide" each provide two cases, and each time one of these commands is used, the corresponding branching should be implicitly or explicitly decided of, or implicitly or explicitly decide that the case is impossible or must not be used in the context of the call (which is a manner of restricting the scope of the command). The SM language and tool supporting it, verify that each branching is either achieved, or implicitly or explicitly resent to "error" which, by convention, expresses the impossibility property of the corresponding transition.

The fact of asking these questions during the description and thus the definition of a program incidentally facilitates the program segmentation into cases during the definition for use as a program/sub-program in the definition of other programs to come. For example, the first usage of removeFirst in the second version of "remove", infers the case "notin" of the program "remove" during the definition.

1.13 Branchings/Impossible Transitions

Typically, the potential to want to express, and then prove/ verify that certain transitions or prior-defined cases are impossible at certain points (in some of their usages). This is what has been carried out several times in the description of axioms as much as in the programs to be proven, by using the branching (implicit or explicit) provided for this purpose in SM language. Hence, it is the preferred manner used here for deciding on the cases to be used for a command or a program, and introducing constraints on transitions, however it is obviously not the only manner. Furthermore, the computer software may allow for it even when the language does not allow for it, if need be, by adding annotations and specific processing.

1.14 Capacity of Restricting the Semantics of Certain Steps

Considering that a program and the transitions it describes thereto, or given a specification/formal description and the transitions it describes (effect on the variables, pre/post, weakest precondition, . . . ), the means are thus provided to express the possibility of restricting the semantics (that is to say, the definition domain, the processing possibilities) of certain transitions, operations, commands or programs, to reduce them to transitions which are more appropriate (as they use certain primitives or well understood or well-honed parts, or for any other reason). For example, it is the case in the previous examples for the first versions of "remove" and "divide". In many situations this technique is an alternative to the previous one (a version with a larger domain can be used, but specific cases for the parts which extend the more restricted domain, then declare the impossibility of transitions for the additional cases, or like here use a version having a more restricted domain).

By way of additional example, in an imperative program, it may be decided, for example, that a use of the operation/ instruction "increment of an integer" is limited to the case where it corresponds to the addition without overflow (and hence to the semantics of the increment in the usual mathematical sense). This is typically required without changing the global semantics of the program, or by providing the means to analyze the impact of the modification introduced by this local restriction. In the previous example, the fact may be expressed that the instruction is indeed only called under these conditions (for example, because it is preceded by a test checking that the variable is lower than a value guaranteeing it).

The three previously presented mechanisms are hence linked. In an embodiment, linkage is performed without the third one, by a combination of the two first ones. In general, this is what will be done in what follows. By way of an additional example, a version of the division can be used in a given place, which rules out the case of division by zero. These last two examples may, for example, be obtained alternatively with versions of the increment operation (respectively the division operation) which distinguishes the normal case (that is to say, "true") from the "overflow" case (respectively "divisionByZero" towards "error".

Solely, the association of constraints to transitions has been illustrated here. In embodiments, constraints can also be associated to program points. In the here-presented SM language fragment, the option is taken to only present the mechanisms which make it possible to introduce the constraints associated to the transitions, as a single-point constraint can always be replaced with a transitional constraint by introducing just in front of this point a command which corresponds to this property, a command which distinguishes between two cases "true" and "false" where the case "false" is declared as being an impossible transition. The association of single-point constraints hence becomes a particular case of associating a constraint with a transition. By contrast, in the case of a language where constraints cannot be directly expressed on the transitions (the case for current languages) and place constraints (that is to say, typically invariants to be selected from a list or combinatorics of predefined properties) in front of the call instruction such as to indirectly reduce its useful semantics, it is possible to structure these properties into a property disjunction each one corresponding to a case, then use the "restructuring" techniques introduced hereinafter in order to associate the thus identified cases to structural constraints (or subsequent transitions). Furthermore, it is not merely a case of placing invariants, but rather invariants associated with instructions, as well as being guided and assisted (for example, by selecting from a list of possible cases or by leaving the responsibility of choice to the equipment).

1.15 Characteristics of Obtained Programs

The program obtained by means of the equipment, and particularly in the case of SM, its intermediary form may be considered as resembling a "flowchart" such as defined by Robert W. Floyd, with several features. First of all, by resuming the definitions used by Floyd, whereas the functions of interpretation, and in particular the right identification of what is generally called "loop invariant" in Floyd and in most proof approaches which followed, are essential to the proof in-itself, here, it is not necessarily the case. They may be defined and be used in a traditional manner (that is to say, as in Floyd-type approaches), however, the invention introduces new original manners. Particularly, all or part of the interpretation functions or invariants provided by the user may be proven as will be seen.

Furthermore, a Floyd-type approach has, at a given time, one single instance of what is called, herein, "single-point constraint". This constraint is placed at the end of the program (or like a couple of pre-post conditions located at its ends) to describe the function or one of the functions that are expected of the program. The proof of this unique constraint is achieved by exhibiting a coherent interpretation function, or by providing loop invariants which make it possible for us to calculate this interpretation function (Dijkstra-type approach). In the approach of the present invention, a tool is proposed, allowing us to associate several local constraints that are referred to as local properties (at several program points), typically, wherever they appear natural to the user to express (for example, the equality located in the axiom loop (2)). Then, either classic techniques may be used, consisting in completing the associations (adding some invariants, also called here local properties, which in some way add redundancy) such as to obtain an interpretation function coherent with the constraint or constraints and make a proof by invariant, or use other more specific proof techniques that do not necessarily require the use of loop invariants or interpretation functions. For example, the tree structure can be used by using the logic sub-routes leading to this point in order to characterize the properties in this point. Other more obvious specificities when comparing the method presented here with the instrumentation of more classic techniques derived from Floyd-type approaches are, of course, the use of constraints associated with transitions, the interdiction of certain constraints, and obviously the possibility to use thus instrumented programs as "axioms" (for example, axioms (1) and 2)), as well as intermediary program ("lemma" programs in a certain manner).

In general, other components of a program such as its sub-graphs may be associated with local properties. A program being defined and provided with an execution model, for example, deterministic or not, with or without backtracking possibility, a program can be used for describing several types of sets, that is to say, domains, including data.

As regards expressions, those used for the program description are generally distinguished (that is to say in a way those defining its semantics) from those used to express the (typically local) actual properties of the described program or the properties attributed to it. In the rest of the document, the term property is only used in this second sense. In the other use cases, there will be mention of transition semantics or point domain.

1.16 Re-organization

In certain cases, it can be useful to modify the structure of the program in order to facilitate the verification. There are numerous reasons which may lead to not construct directly the structure that is thought to be the best adapted by using the aforementioned mechanisms. For example, for methodological reasons (starting from a program that has not been described with a tool based on the method described here), or simply because several different views corresponding to different program structures are required (in order to address, for example, different verification needs). However, it can also be due to using a language different from that of SM which does not allow to express the case breakdown of the processing, or the impossible transitions. The re-organization hence consists in transforming the structure of the program (its branching, its nodes, the annotations and cases used). Of course, the program transformation described in this section does not necessarily need to be actually achieved, but can simply be an abstract view of the program used by the equipment for its own verification needs or for user interaction.

For the sake of simplicity, the presentation is limited to using very basic techniques to illustrate it. Thus, the one hand is limited to constant semantic program transformations, and on the other hand, to only the following elementary transformations being used: a first basic transformation is to consider one or several transitions arriving at one program point (not necessarily all transitions arriving at this point), to redirect these transitions towards a new point (a clone of the first, which will particularly have the same annotations where required) and to duplicate (clone) the transitions which originated from it (obviously, by using the same annotations for the cloned arcs). This transformation ensures semantics preservation provided that the name of the program point does not have any effect on the semantics, which is generally the case and is particularly the case for the presented SM fragment; the second elementary transformation consists in carrying out a graph cleaning operation, for example, by deleting the dead branches as already seen; a third category consists in adding intermediary steps without affecting the semantics and whereof all the cases are branched at the insertion point. Of course, the possibilities depend on the adopted semantics. Typically these operations, with the semantics based on the examples from this disclosure, should be without effect on the variables, and without preconditions or with satisfactory conditions on all values at the application point. On the contrary, deletions of certain intermediary steps may be achieved, when these steps are neutral for the chosen semantics, and finally, a possible specialization of certain annotations: when certain parameters of a logic annotation are known the latter may generally be simplified (for example, add(i,j,j+) may be replaced by increment(j,j+) when «i« has for value »1», $p(x) \Rightarrow q(x,y)$ may be replaced by $q(x0,y)$ if value x0 of x is such that $p(x0)$=true).

First example: return code. In a program and particularly in a program written in a language that does not support, unlike SM, the separation into different return cases and associated branchings, or supporting this possibility with a certain cost in terms of execution (for example, exception mechanisms in an execution language), a return value can be positioned which characterizes the manner in which exits a called program (for example, "0" if exit is carried out normally, "−1" in another case, and just after the call to this program, be led to test the return code and based on the value "0", "−1" or any other unexpected value to be branched to different places in the program. In order to place oneself in the operating conditions of the present method one may "clone" the exit point of the called program on one side and then clone the points that are immediately after the called program in the calling program, and that perform the testing of the return value and corresponding branching. This is done by using the transformation (a) one or several times, that is to say, once for "−1" and potentially once for unexpected values, such as to have three kinds of points both in the called program and in the calling program each specialized in a case. Then, it is noted that the state corresponding to the normal exit will always have the return code positioned at "0" and hence, following the test carried out on the return value, the same branching will always be used. Consequently, the other branchings implemented are impossible. The other points will have the same properties, that is to say, that corresponding to the return code "−1" and that corresponding to the other cases but obviously the branchings used and the branchings rendered impossible after the test will no longer be the same.

Second example: Virtual machine (VM). It is supposed that a virtual machine or a language interpreter is described using a program. Typically, an interpreter loop will be provided in which the instruction corresponding to the current point can be read and decoded. This point can thus be considered to be located in the interpreter loop where this processing starts, and insert, just before it, an instruction which carries out itself the reading and decoding operation (typically by duplicating it), except that it will have as many exit cases as the number of possible instruction types existing in the program to be analyzed, as well as a certain number of exception cases, that is to say incorrect memory area, illegal instruction, etc.), and where all the exit cases of this intermediary instruction are branched, whereof the semantics will be such that they are without effect on the variables and without pre-condition, that is to say, total, at the insertion point. This transformation is hence of (c) type, and thus, the situation is found of the previous example where the other two types of transformation will be applied, such that an equivalent program will be found which will have this time "cloned" the analysis point of the command, such that if a particular program is selected to interpret the transformation can be pushed a bit further (by applying in a quite natural manner the set of authorized elementary transformations) until the interpreting loop has been replaced by a structure which will replace that of the program to be interpreted. This can be achieved more directly in fact in using in the first step a reading and decoding operation that has as many steps as program points of the interpreted program: each point corresponds to a particular program instruction, but the same instruction being potentially used many times in the same program, a more precise structure is obtained for the transformed interpreter which happens to be exactly that of the interpreted program. In a certain manner, a partial execution of the program will have been done, when the program to be interpreted has been transformed.

In these two examples, an equivalent program will be obtained by transformation except for certain intermediary steps that may be considered as invisible. The second program thus obtained will be such that the proof of its properties will make it possible to deduce properties of the first program, and will have a richer program structure, which will allow for applying certain "static" techniques, introduced here. Knowing that the executions of one of the programs may easily be found in that of the others (considering the nature of the applied transformations), a user may be easily convinced that it will be easy to establish certain sufficiency relationships between local properties of the programs (that of the start and that obtained after transformation), even in the case where the proper separation in cases and relevant branching has not been obtained when describing the program of interest (for example, in situation where the implementation or specification language doesn't support for separation in cases). Hereinafter, the possibility of establishing sufficiency relationships will be illustrated in a more detailed manner.

3. Use of the Program Structure with its Local Constraints Associated with the Transitions for Program Verification The use for verification may intervene in the expression of properties, and/or for the proof itself.

Expression of properties: As for the expression of logic properties (essential in program verification) the techniques consist in considering the programs obtained with equipments exhibiting one or several of the previous characteristics (and hence with them the constraints that they express) as if they were logic properties, (i) either as a means to structure more elementary logic expressions, (ii) or as logic expressions in their own right (a program would be a logic expression in a new type of logic system, where inference rules would be replaced by more sophisticated rules intended for more complex electronic processing).

1.17 Decomposing the Program into Elementary Properties

Thus, in the axiom1, it is decided that only the main case "removeFirst" (and hence its corresponding transition) is possible at the point where this command is invoked (that is to say after call of the first command), and that the case "empty" is impossible. This makes it possible to express a constraint/property at this point (which, here is assumed, that is to say it is an axiom, however the same program fragment may just as well be used to express a property to be proved, or an intermediary lemma). Intuitively, this constraint only expresses that when the program reaches this place whatever the state of the variables, it is impossible to take the branch "empty" (that is to say one is not in the application conditions). Secondarily, given the underlying execution model, i.e. without backtracking or deadlock, it also expresses that the remaining branches are applicable (or that this point is never reached meaning that it is a dead branch).

1.18 Link Between Local Properties of the Program and "Proof Obligation"

It may be desired, according to the case, to want to make the link between these properties and more classic logic formulations (that is to say, typically "proof obligations") in order to call classic logic proof environments. In this case, the programs and the three mechanisms that they implement using the equipment, purpose of the invention are to be considered as a manner to structure the elementary logic properties, for the interaction with the user (but also potentially to facilitate the work of the equipment) during the proof.

First of all, bearing in mind that a route in the program leading from one point to another, by taking the branchings (not declared "impossible) in the execution flow of the program, may be associated has been seen with a logic trace which may itself be associated with a logic expression which describes the constraints that must be respected by the values taken by the program during the execution leading from the first point to the second. Considering the program point towards which such a route leads, or more generally a program point and a set of routes all leading to this point, if certain transitions starting from this point have been declared impossible, then for each impossibility there is a property of the form $\forall A.P \Rightarrow ]\exists B.Q$ where the premises P express logic properties on the route/routes leading to the point of interest and Q the relationship associated with the transition (and potentially also whenever applicable the properties associated to the start and end points of the transition). Other complementary properties may result from the execution model. With the underlying model used here (imperative model without "backtracking", or "deadlock") there is in addition a property with the form $\forall A.P \Rightarrow \exists B1.Q1 \vee \ldots \vee \exists Bn.Qn$ where $Q1, \ldots, Qn$ representing the relationships of branches allowed starting from the point of interest. For the axiom1, for the second program point, that is to say, the point located between the first command empty(e+) and the second removeFirst(x+,e,e+), and the only logic trace/route that leads thereto we have—:

$\forall e. [true]empty(e) \Rightarrow ]\exists(x,f) [true]remove(x,e,f)$

For the first and second point, properties can be added expressing the progression that are due to the underlying execution model.

$\exists e. [true]empty(e)$ $\forall e. [true]empty(e) \Rightarrow [empty]remove(-,e,-)$ Thus, there generally is a manner of generating a set of basic properties associated with a program. Each property, being itself associated with a node and a route or set of routes leading to this node in the program graph.

1.19 "Proof Obligation" and Programs with Loops (Invariants and Implicit Invariants)

When there is a finite number of logic traces, programs without loops cam be implicitly or explicitly limited. Here, three possibilities are exhibited which involve the use of loop invariants. The first two are presented in the remainder of this section, the third will be presented in a separate section.

The first is the classic use of loop invariants in the program to prove. The user proposes invariants (at least loop invariants). Typically, for a program with three branches A, B, C that can be taken in this order, with the possibility of looping on B, or skipping it (that is to say, the possible executions of the program all conform with the regular language (A(B)*C), provided with a proposed loop invariant called I, apply the invariant technique is resumed to using, for example, instead of the start program the programs without loops: AI, IBI, IC, where alternatively AIC, IBI depending on the approach used. As in a conventional manner, these invariant techniques are used on the target program (the theorem program, and not an axiom program), it is generally not necessary to use/exhibit invariant properties, which characterize with precision the properties of the start program at the insertion place of the invariant. It is sufficient to use a weaker property which is at the same time a satisfactory property in loop entry and preserved by the loop and sufficient for proving the properties of interest. In a certain manner, the classic use of the invariant is a direct usage of the induction, and in fact, whatever the logic trace of the first program, it is known how to associate logic traces with it from the set of associated programs. For example, to the logic trace corresponding to ABBC, it will be obvious to assign to it the traces AI, IBI, IBI, IC from the associated programs without loops; but the correspondence does not need to exist in both directions. It is possible that, instantiating traces of IBI do not correspond to any execution of the start program, as the invariant is potentially weak.

The second possibility is illustrated by means of an axiom2 which can make it possible to generate an infinite number of routes and hence logic traces, and hence an infinity of logic properties. If such a program was a theorem rather than an axiom, the previous case could be found. When such a program is used as an axiom, which is specific to the presented method, although it is not classic, the same technique can be used under the condition to have an invariant that corresponds exactly (and not merely loosely) to the property respected by the variables at the insertion point of the invariant. However, the most important thing is the fact that it is not necessary, when using the claims, to make explicit this invariant. It is possible, and it is a feature of the method, to use an invariant of a new type which is called implicit invariant. In the example of the axiom2 a loop invariant is used located at the start of a loop (it is more practical but not the only possibility), referred to as « implicitInvariant(x,e,f)» , which pertains to the variables defined at the start of the loop (which a static analysis may easily give us). The latter is implicitly defined by induction (by definition it is the strongest invariant which is applied at the start of the loop on the variables x, e, f). Once this implicit invariant is thus defined, the situation is found wherein an axiom program has been replaced by several programs without a loop (here three as there is not only one single loop in the start program).

These three programs are:

```
program //axiom2a
{
    addLast(x,e,f+) ; => implicitInvariant(x,e ,f) ;
}
program //axiom2b
{
    implicitInvariant(x,e,f) ;
    {
        [empty :false]removeFirst(y+,e,e+) ;
        [empty :error]removeFirst(z+,f,f+) ;
        [false:error](y=z) ;
    }
    => implicitInvariant(x,e,f) ;
}
program //axiom2c
{
    implicitInvariant(x,e,f) ;
    {
        [true :false,empty :true]removeFirst(y+,e,e+) ;
        // following instructions not useful
    }
    =>
    [empty :error]removeFirst(z+,f,f+) ;
    [false:error](x=z) ;
    [true:error,empty :true]removeFirst(z+,f,f+) ;
}
implicitInvariant(x,e,f) ->[false]
implicit program
```

It will be seen how to use this implicit invariant generation technique for the proof of property.

The properties expressed by the axiom2, are generally not simple to express in the existing formal approaches (for example, in the present case, several quantification levels would have been used to express the invariant explicitly). Here, it is enough to follow the execution of the program in order to understand which local properties apply to which flow of execution and at which step of these flows. Thus branching induces separation of flow, and allow for more local properties. Here, local properties are described as transition impossibilities (or semantic or scope restrictions used). These local properties basically express here that when an element "x" is placed at the queue of a sequence "e", the sequence "f" thus obtained, if it is emptied element by element, will give exactly the same elements and in the same order as the sequence "e" if it is emptied in the same manner. That is what the loop expresses. When the latter will have been exhausted, there will be exactly one element in "f" which will happen to have the value of "x", as expressed by the part of the program located after the loop.

In an embodiment, a program or fragment of a program (that is to say, a program sub-graph), may be seen as a manner of defining several relationships), particularly a relationship per type of exit (label). Obviously, it is possible to consider the unique global relationship formed by the union of all these relationships, however, it is not the option that is taken here. Thus, let it be considered that, for example, the following program fragment extract of the axiom2 (this program fragment corresponds well to a SMIL sub-graph, from the graph of the axiom2),

```
    {
2 :     [empty :exit]removeFirst(y+,e,e+) ;
3 :     [empty :other1]removeFirst(z+,f,f+) ;
4 :     [false:other2](y=z) ;
    }
``` naturally defines several relationships, the relationship which corresponds to the exit "true" of this program fragment (in the context of the axiom2, it is the case of the loop path), that which corresponds to the exit "exit" (exit of the loop in the context of the axiom2), as well as those corresponding to cases "other1" and "other2" which in the context of the axiom2 are stated to be impossible (in this instance empty, since pertaining to relationships). F will be the name of the first of these relationships in the sequence. F will thus be the relationship corresponding to one execution of the loop in program Axiom2. Then, E will be the name of the relationship corresponding to the normal exit (that is to say "true") of another program fragment, the latter leading to the entry of the program Axiom2 at point 2 (without any looping on this point). E is thus the relationship corresponding to the program fragment preceding the entry into the loop for the program Axiom2.

Now, if an interest in (a) is taken, on the one hand, the more complex program fragment P1 of the axiom2, which uses the same entries as the axiom2 but exits on the transition leading from the program point 2 to point 5 (that is to say, corresponding to the case "empty" of the instruction associated with point 2, that is to say, the exit of the loop), (b) on the other hand, in fragment P2 which enters in the axiom program (2) at point 5 of the axiom and uses the same exits as the axiom, there are two program fragments which play different roles with respect to point 2 of the program Axiom2. The first program fragment is, of course, a combination of the two previously identified program fragments, which correspond to the relationship E and F. As the programs described here assume an execution model without backtracking, this first program, P1, expresses in a certain manner the properties which characterize the values of the states at point 2, of the program Axiom2, whereas the second program, P2, expresses the properties which should verify these states at point 2, given the rest of the program. If the relationships corresponding to the main "true" exits of these two programs are respectively called FP1 and FP2 (that is to say, the only ones considered here), these relationships respect the following property: $\text{rng}(FP1) \subseteq \text{dom}(FP2)$.

Hence, when placed in a program point, here the point 2 in the program Axiom2, the program fragment which leads to this point without ever going back to it again (in this instance in the present case the point 2 is in a loop and the program P1 responds to this constraint), makes it in particular possible to specify the domain of values that can be taken by the program Axiom2 in this point, here the point 2 (i.e. $\text{rng}(FP1)$), while the program P2 makes it possible to specify the domain, at this same point, making it possible to satisfy all the operations coming after this step in the execution. The different operations used in these programs here, being deterministic, the different relationships are functional (but not necessarily total), particularly relationships E, F and FP1. It is easily shown that $FP1 = E \circ (F^0 \cup \ldots \cup F^i \ldots) \circ G$ where $F^0$ is the identity and $F^i$ is the composite of i application of the function F, and G is a restriction of the identity function in case the sequence e is empty. Thus, it is easily shown that FP1 may be obtained as a fixed point equation, in this instance those implicitly defined by axiom2a and axiom2b (the strongest property satisfying this definition exists and is $\text{rng}(FP1)$). The third implicit axiom, axiom2c itself representing the properties expressed by the property $\text{rng}(FP1) \subseteq \text{dom}(FP2)$.

In embodiments, an implicit invariant has been defined in a case where the automatic generation of an explicit invariant would not have been possible due to the presence of a loop.

1.20 Invariant Programs

In the SM language, even if it is possible to use classic invariants (that is to say properties at program points), it is also possible to use real program bits, handling in addition to the program variables, potentially their own invariant variables. Instead of making explicit the invariant property which is applied to a program point, an invariant program is used (bit of a program) which does not modify the current state but can modify its own invariant variables. This invariant program implicitly characterizes the state to which it is applied (that is to say, its entry parameters) by describing the behavior that such an invariant program would have when triggered at this place. Of course, as many invariant programs as required (and potentially put one in each program point) can be used. These invariant programs may also share some of their invariant variables (the initial value of an invariant variable is that left by the invariant program which has preceded it). These invariant programs may be seen as symbolic tests and make it possible to indirectly/implicitly express local properties.

Typically, static techniques will be used so as to make sure that the invariant programs do not modify the behavior of the programs on which they are placed, as well as to show the initialization and typing properties of the invariant variables. If is decided to use traditional verification techniques based on invariant techniques, these program invariants typically are reduced to "proof obligations".

Here, too, the program with program invariant may be considered as a second program which only needs to be proven in order to prove the first (that is to say, prove its properties). The use of program invariants is thus an illustration of a use of a second program, i.e. the program with invariant, having different functionalities from the first program, and/or not merely being an abstraction of the first program, as a way of the securing the first program. It can also be considered as an illustration of setting sufficiency relationships between the two programs, but this is not developed here as dedicated illustrations are proposed thereafter. The program invariant is also a manner of using program fragments, that is to say, the invariant programs in order to implicitly describe invariant properties which would have alternatively been explicitly expressed in these points.

1.21 Proof

The general approach is mainly about operating the structure of logic programs (program points, transitions and associated constraints) by using program analyzing techniques, automaton theory or program transformation, in order to achieve or simplify verification, by potentially combining them with traditional proof techniques. However, the structure of the programs may also be used such as to structure the proof and present its progression and to interact with the user. Finally, a last operating possibility which will be introduced is the correlation of local properties of one or several programs to propagate certain proof results, particularly certain transition impossibility proofs.

1.22 Interaction with the User

When a program point is reached during execution of a program (hence having taken a route in this program), none of the program transitions starting from this point and declared impossible should be able to be executed and this must be able to be proved. Furthermore, if the execution model is without backtracking, one at least of the transitions allowing us to start from this point amongst those declared impossible (the program points and cul-de-sac transitions are removed after the declaration of impossibility of using the branches leading thereto, and so forth: it is a program analyzing technique that is applied in order to simplify the program and put it in a normal form) is "finable", and this should also be able to be proven. Hence, it is proposed to structure the proof in this manner: the tool attempts to prove the impossible transitions in each route, and identify when it fails (and each time that it is possible) the route/routes (they are prefixes of routes in practice) which prevent it from proving the impossibility of a transition (the set of identified routes able to be represented by a sub-graph/fragment of programs, particularly in the case if infinite sets). The user can thus analyze and get an idea about the route/routes which lead to impossible transitions which the environment cannot demonstrate. This can enable the user to get a better idea about the problem (property that is actually false and unable to be demonstrated, or indication to give to the environment in order to resume the proof).

1.23 Structural Transformation of the Program

When the method is used, the verification itself is based on the program structure and the constraints associated with it, so that it is generally possible to carry out all or part of the verification by transforming the program until leading to a form that can be automatically or easily proven. Here, it consists in transforming a program (which according to points of view is either a logic property in a high-level logic, or the manner of structuring the most basic and conventional logic properties) into another equivalent program which will either have exactly the same semantics or semantics such that the proof of certain local properties of the second make it possible to deduce that of other local properties of the first. It will be said that a local property of the first is in a sufficiency relationship with certain others of the second, if the proof of the set of the latter makes it possible to deduce the proof of the first. In this instance, for illustration needs, the particular case of equivalent programs will be taken. Two programs will be considered as being equivalent if they have the same real traces, (one simply deletes the logic traces or sub-logic traces that do not have a solution and hence no possible instantiations, and hence no corresponding execution traces), except for potentially certain steps considered as invisible. Each transformation may thus be considered as a proof step. Of course, it is not necessary to have equivalent programs, in order to establish and operate "sufficiency" relationships between local properties themselves, the case where the two programs are equivalent being a particular case. For the sake of simplicity, the notion will be introduced through several examples of equivalent programs.

In these examples, for the sake of simplicity, constant semantic transformations are used. More generally, what is important is that such a transformation makes it possible to establish one or more sufficiency properties, that is to say the proof that a local property of a program can be established if there is proof of the properties in correspondence in another program.

Two examples are taken, the unfolding of a definition and the deletion of dead branches. Considering Theorem1, it is possible to unfold "member" by its definition (by the body of its definition) on condition to manage the conflicts of names of the variables if need be, for example, by using fresh names of variables for the variables of the body of the unfolded program. In this instance, the following program Theorem1Unfold would be obtained:

```
Program Theorem1Unfold
1 : addLast(x,e,f+) ; // we can leave => here
[true:error,found :true] //and use [true:false,found :true] instead.
{ // the internal representation (the annotated graph is the same in all cases
2 :     g :=f ; // g is a new variable to prevent a collision
        while
        {
```

-continued

```
2.9 :   //loop
3 :             [empty :error]removeFirst(y+,g,g+) ;
4 :             [true:found,false :true](x=y) ;
        }
}
```

The two programs thus correspond in both senses, and here, in a reversible manner as the transformation is an equivalence. Certain transitions/arcs (or sub-graphs) can be put in correspondence in the two programs. One will have, for example, the forbidden transition of 2 towards "error" and labeled by «[false]member(x,f)» that corresponds to «[empty]removeFirst(y+,f,f+)» in both senses (i.e. two symmetric directed correspondences). If one is proven impossible, the other may also be considered as proven. For example, if the impossible transition of the first program is considered, it has a sufficiency relationship with the second transition, that is to say that in order to prove its impossibility all that needs to be done is prove the impossibility of the second one (that of the second program). More generally, there could be a set of transitions associated with one transition by sufficiency relationship (that is to say, to prove the impossibility it would be sufficient to prove that the sets of transitions in correspondence is impossible). More generally, the correspondence may also be obtained between sub-graphs. Here, the transition of the first program also corresponds to the sub-graph going from the point preceding the entry in the loop (here, the point is not materialized but could be called 2.1, that is to say, intermediary points can always be added, just as if one had added in the program, the instruction, «nop( )» which has no effect on the variables and which is invisible) and the exit of the loop (that is to say, (i.e. «[empty] removeFirst(y+,f,f+)»). Likewise, the proof of impossibility of the transition of the first program (which signifies that no instance of this transition is possible at this place in the program) is equivalent upon proof of inexistence of an execution trace instance taking this sub-graph at this place (of course what is meant here is the existence of a route crossing the sub-graph from end to end). There is also mention of the impossibility of a sub-graph, or the fact that it is dead, which does not mean that all its transitions or points are dead (in this instance there are other possible exits from the loop, on «[true](x=y)», which are actually possible. For a sub-graph, the impossibility is equivalent due to the fact that all logic traces crossing the sub-graph right through without solution (typically the logic expressions corresponding to them all are without a solution, that is to say, they all make it possible to infer "false", or due to the fact that there is no logic trace (no route leading from the start until the end of the sub-graph). It can be observed that the impossible transition is a particular case of an impossible or dead sub-graph. When a sub-graph is impossible or dead, and proven as such, one may generally cut the dead branches (here in this instance the transition «[empty]removeFirst(y+,f,f+)»).

2 Embodiments of the Invention

2.1 Composition with Synchronization

Most claims are illustrated using an innovative technique that is called here "composition with synchronization". It is illustrated on the proof of Theorem1, or more precisely on the proof of Theorem1Unfold as it is known how to secure Theorem1 using the securing of Theorem1Unfold. On most examples the "target program" will also be one of the "elementary programs". The case where they are different will be the exception in the sequel of this document.

Here, the exits known to be impossible (that is to say, «error» branches) correspond rather naturally to the cases where the implication would return "false". It is sought to prove this theorem using the axiom2, which intuitively expresses that after having added an element at the end of a list, and after having parsed the two lists in a synchronous manner, a situation is obtained where the list of origin is empty and where the increased list includes an element that is equal to the added element.

To achieve this, a third program is used, obtained using a certain "composition with synchronization" of the two previous programs. Here the two "elementary programs" will be Theorem1Unfold and Axiom2. Theorem1Unfold will also play the role of the "target program", and the result of the composition will be the so-called "correspondence program". The composition is here a parallel composition between two programs, which synchronize with each other at certain points. It is required here, that the execution of first program, Theorem1Unfold, not be disrupted/impacted by the composition, that is to say, not be constrained by its composition with the second. In order to describe the composition, it is sufficient to describe its synchronizations, since between two synchronizations the programs are supposed to behave normally, that is to say as if they were executed on their own, in parallel.

Hence, it is proposed that the Axiom2 program uses the same values of variables "x" and "e" as those used by the first program. The advantage of this initial synchronization is that it does not disrupt or more particularly does not constrain the execution of Theorem1Unfold which should be the same whether executed on its own or when composed (here the focus is not on the execution time, but only (1) the sequencings, that is to say, order relationships, between events, and (2) on the values of the variables taken by the program during its execution). Such composition is said not to constrain the program Theorem1Unfold. Return will be on the "non-constraint" concept, but the underlying idea is about making sure of proving the properties of the target program, that is to say, Theorem1Unfold here, in a general way, and not only for certain values or for certain of its particular cases. More precisely, it is considered that execution of Theorem1Unfold instantiates/starts based on any values of the entry parameters (it is a universal quantification). Here, there is no pre-condition to satisfy, hence an execution can start with whatever the values provided in entry to Theorem1Unfold, provided that the parameters have the right static properties, that is to say, a good typing and a good initialization. Here, the language is typed. However, the claims do not depend on this feature, or even not necessarily on this particular notion of non-constraint. The claims are not based on the presence or absence of preconditions either.

From a semantic point of view, this first example of composition with synchronization may be expressed in the SMIL language using a "fork" of Axiom2, placed here at the entry of the program, that is to say, the composite program is obtained, for example, by modifying the Therorem1Unfold program, by inserting a "fork" which, on the one hand, executes the Theorem1Unfold program normally and, on the other hand, launches Axiom2 in parallel with the current values of "x" and "e", that is to say, those given in entry to Theorem1Unfold and thus to the composite program. Typically, a tool can be imagined, which offers the user a choice of operations whereof the application at a place is non constraining by construction, which is the case here. In other situations non-constraint may not be guaranteed by construction and may require the discharging of proof obligations. The fact of launching with a "fork" a second program without precondition (lemma, axiom, . . . ) and assigning to it in parameters values present in the current environment of the first program is an example of a non constraining operation. By launching these two programs in parallel (the rest of Theorem1Unfold and the instance of Axiom2) the first synchronization has thus been specified here. For the sake of simplicity, the syntactic elements allowing to describe this type of synchronization in the SM language are not introduced and it is simply described how this composition with synchronization may be achieved in the SMIL language. In another language instead of SM, this would amount to extending the language or allow the tool a certain instrumentation (scaffolding). It will be seen that the aforementioned "join" primitive will also be needed.

In order to obtain a composition that makes it possible to prove the properties of the Theorem1Unfold program, other synchronization points will now be added. For illustration purposes a very basic synchronization strategy is chosen. It is non constraining by construction: for each of the two programs used for the composition a set of synchronization points is identified and it is considered that all the combinations between synchronization points are compatible. It is considered that each program executes normally in parallel until it meets a (new) synchronization point. The synchronization point may be described in the SMIL language by using a "join", potentially followed by a "fork" in the case where the programs synchronization points are not exit points and the program need to continue their progression in parallel. In a certain manner, it consists in a basic synchronization strategy: once this strategy is selected, the tool may itself build the synchronization graph.

When the two programs have reached the following synchronization point, they hence each resume their execution until finding a new synchronization point and so on and so forth. This manner of synchronizing is obviously non constraining, provided however, that a program does not wait eternally for another program which will never reach another synchronization point, either because it loops before synchronizing again or because it has terminated. The issue of loops, which can in general intervene in one of the programs synchronized between two of its successive synchronizations may be processed according to the case either by discharging proof obligations, or by checking certain static conditions. In this instance, in the following examples, loops will be avoided using structural constraints (and hence static checking) no loop is possible owing to the actual structure since loops of composite programs all contain synchronization points. Hence, if they loop, they do so together and not separately. Nevertheless, the issue linked to the fact that one of the programs may encounter a synchronization point while the other program has already terminated its execution and is not waiting for synchronization must be seen to. This could in fact impose a constraint on the program. Hence, it is, for example, decided that when one of the two programs ends the other is freed from any synchronization constraint, and continues its execution normally. It may hence possibly loop back, but without having any incidence on the other program. Such a synchronization diagram is clearly non constraining by construction for both programs. Coming back to the illustrative example it is supposed that the choice of the synchronization strategy intervenes at the time the "fork" is inserted in the first program (here the initial "fork" of Axiom2), and not in two steps as has been done here for presentation purposes. Of course, there are many other possible synchronization strategies and the question here is not about finding the most satisfactory one but simply to illustrate composition with synchronization. Other possibilities will be seen which may not be non constraining by construction and may be done on condition of discharge of proof obligations. In all of these cases, it is rather easy to imagine a tool making it possible to support the user in his/her description of the composition and compute when the non-constraint check is not done in a purely static manner, the proof obligations to be discharged.

Figure 5:
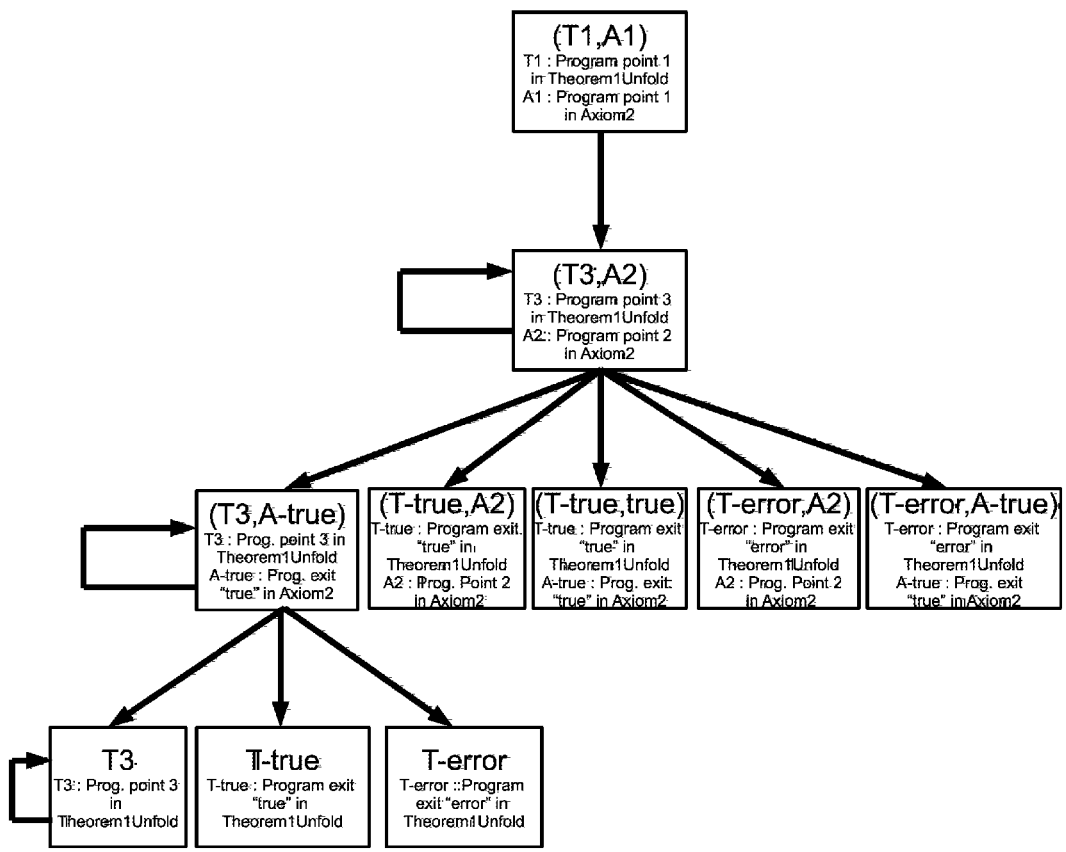
FIG. 5 is a flowchart of constraints for combination of examples "Theorem1Unfold" and "Axiom2"

Before indicating the synchronization points, chosen in the example, it is worth noting that the idea is to illustrate most claims, using the same example. The composition with synchronization will be used to illustrate how to automatically construct the correspondence program a composition strategy/(provisioning of synchronization rules) is put forward. The output of the composition may be considered as a program in its own right, even though it is a parallel program with synchronization, or even though in most cases it doesn't need to be presented/displayed as a standard program (e.g., FIG. 5 represents the correspondence program). Each execution of this composite program may in this instance be put in correspondence with an execution of the Theorem1Unfold program, and an execution of the Axiom2 program. If it is to be considered, for example, that one may represent a behavior by the corresponding trace (respectively a trace prefix), an execution trace or (respectively a prefixes) in the composite program is a partial order, that can easily be placed in correspondence with two execution traces (respectively two prefixes), one in the Theorem1Unfold program and the other in the Axiom2 program. These two latter traces are, in all examples, sequential (that is to say, total orders), but could be themselves partial orders as well. This placing in correspondence also infers a placing in correspondence and hence a relationship between the traces of the two programs Theorem1Unfold and Axiom2. The set of traces of the composite program represent in a certain manner the graph of the correspondence or coherence relationship between the behavior of the two programs. The non constraint property may be thus expressed in a more formal manner here like the fact that each behavior (partial or total) of the first program corresponds via the thus established relationship, with an acceptable behavior of the second, and hence, in other words, that this relationship is total, that is to say, any behavior of Theorem1Unfold should have an acceptable correspondence in this relationship, but the reciprocity (that is to say the subjectivity), is not necessary. The fact of being able to see the non constraint property as a totality property of course depends on the precise manner with which is defined the relationship and notion of trace or even the acceptable evolution notion. These theoretical considerations are not further detailed here as concentration is being given to the invention.

This program, obtained here as a result of the composition with synchronization of the two first, is the so-called "correspondence program" and will be mainly used as a correspondence relationship between the two elementary programs, either to establish logic sufficiency relationships between local properties of the these two programs to later infer local properties of the target program, i.e. Theorem1Unfold, from those of Axiom2, or more directly secure the first program based on the securing second (and by using the correspondence program as a link between these two programs), or even as a combination of the two approaches.

The example chosen for the illustration and propose as synchronization points for the Theorem1Unfold program is returned to, the points identified by 1, 3, "true" and "error", where the points "true" and "error" respectively designate as a rule the exit points by labels "true", and "error" (if these points do not exist they can be added in the intermediary representation in SMIL, which is always possible). For the Axiom2 program points, 1, 2, "true" (instead of "true" for Axiom2 we could have taken point 7 and systematically end in 7, the rest of the program being useless for the properties to be proven here) are taken. In fact, determining these synchronization points may be provided by the tool and/or guided by the user (the end points of the program and loop entries are taken, which is a simple strategy that often gives good results, and which may typically be proposed by the tool to the user as one of the predefined strategies preventing him/her from having to specify the points more finely).

Figure 3:
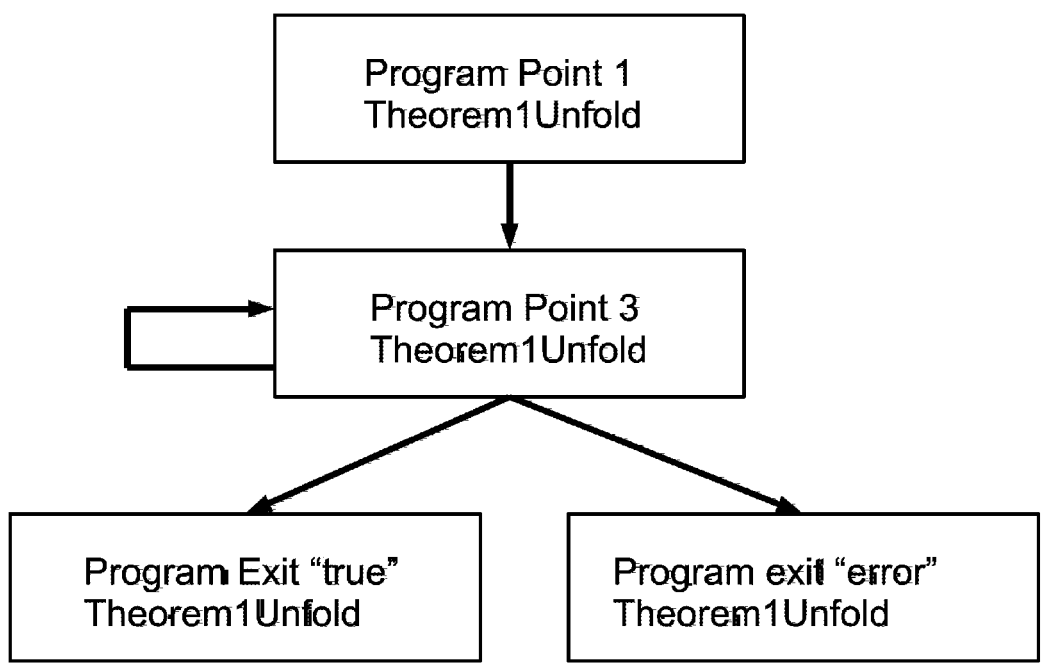
FIG. 3 is a flowchart of constraints for example "Theorem1Unfold"

The structure of each program infers constraints on the manner whereof the synchronization points of a program may succeed each other. Thus, for Theorem1Unfold, these constraints can be represented as depicted in FIG. 3, for example.

Point 1 can only be followed by point 3, which can itself only be followed by point 3 (when it loops back), the "true" exit, or "error" exit. More particularly, the logic traces leading from one synchronization point to the next are represented as follows:

In the state (1):
[true]addLast(x,e,e+); [true]g:=f; →(3)
In the state (3):
[true]removeFirst(y+,g,g+); [true](x=y)→(true)
[empty]removeFirst(y+,g,g+); →(error)
[true]removeFirst(y+,g,g+); [false](x=y)→(3)

Figure 4:
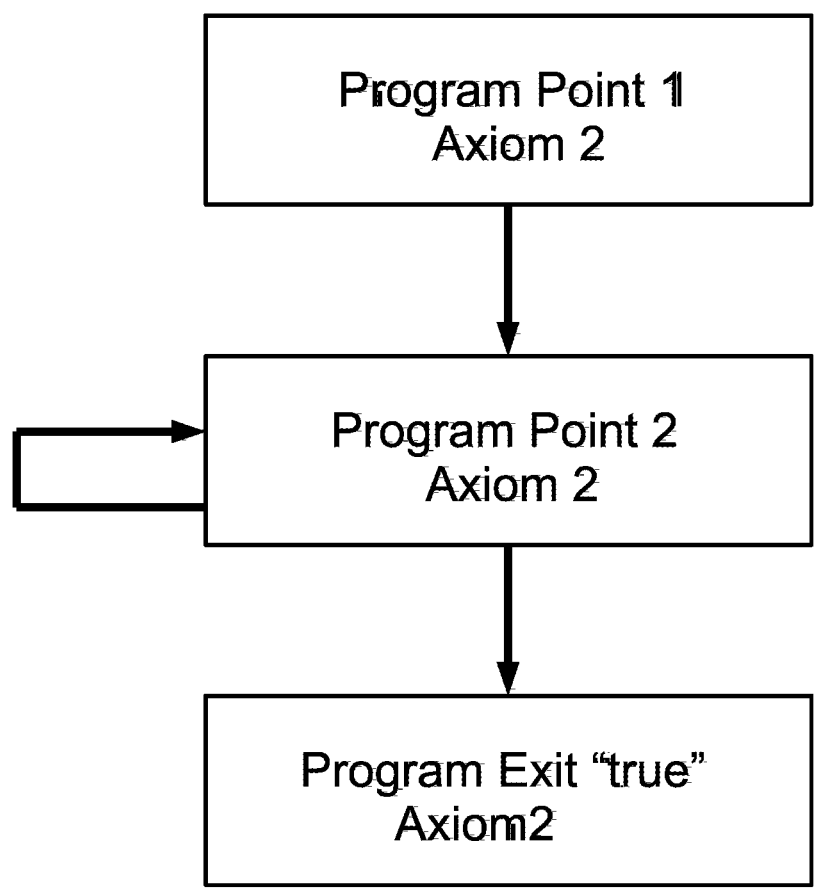
FIG. 4 is a flowchart of constraints for example "Axiom2"

For the Axiom2 program, points 1, 2, and « true» are taken (instead of « true» for Axiom2 point 7 could have been taken and would systematically end in 7, the rest of the program being useless for the properties to be proven here. This is depicted in FIG. 4:

In the state (1):
[true]addLast(x,e,f+); →(2)
In the state (2):
[true]removeFirst(y+,e,e+);   [true]removeFirst(z+,f,f+);
[true]y=z); →(2)
[empty]removeFirst(y+,e,e+);   [true]removeFirst(z+,f,f+);
[true](x=z);
[empty]removeFirst(z+,f,f+);→(true)

Here, the impossible branches already proven to be impossible in the graph are not represented, though they could have just as well been kept visible. This has an impact on the complexity of the composition, and on the list of sufficiency relationships obtained, but does not change the proof result, and illustrates the claims just as well.

In the knowledge that a very basic and loose mechanism for the compatibility of the synchronization points has been chosen, this first gives FIG. 5 if only these structural and synchronization constraints are taken.

Such a graph thus remains pertinent for a program composed of two programs, but its reading is more complex. When a node is considered, for example, node (1.1) and a transition starting from this node, for example, (1.1)→(3.2), this signifies that the synchronization corresponding to the first node is followed by the synchronization of the second node but after the parallel execution of the two respective branches. Hence, the graph represents the manner by which synchronizations may string together, just like the description of a program, except that here each transition between synchronizations does not represent a simple sequential transition that is incrementally "concatenated" to the previous ones in order to form the logic trace (resp. the execution trace if we consider a particular instantiation of logic variables), but as a partial order which represents a trace (the concurrent parallel execution can be represented as the partial order of the local states), which is, as for a sequential program, incrementally "concatenated" to the logic trace (resp. execution trace), i.e. a partial order in this case, representing the already parsed part up behavior so far. This description thus allows description of a (parallel/concurrent) program, the one obtained by composing two programs. Hence, this gives a finite manner of representing the potentially infinite set of partial orders which each represent a logic trace or an execution trace, thus generalizing the view of a sequential program: a sequential program is the particular case of a program that only acknowledges sequential traces, which are represented by total orders. When the program can have executions with a number of unlimited steps, that is to say, infinite executions, here it will come down to its prefixes. Hence, the product of the composition with synchronization that has just been described can itself be considered as a program in its own right, and the synchronization graphs that have just been introduced can be used to describe the SMIL intermediary format. Here the points (1.1), (3.2), etc. of the composition graph are clearly points of the composite program. It is considered here that the other points which make it possible here to describe the intermediary parallel steps are too: for example, point (3.2) has several possible successors, that is to say, several cases, which are all partial orders (initiated by "fork"), and whereof one is, for example, on the one hand the $4_{(3.2)}^{Theorem1Unfold}$ point, of the Theorem1Unfold program and on the other hand, $3_{(3.2)}^{Axiom2}$, of the Axiom2 program, where the indexes and exponents are used in such a way as to avoid possible program point name conflicts: the same point of one of the start programs may be found to be represented several times in the composite program, such as, for example, the point 4 of the Theorem1Unfold program, which here will be found again, for example, in $4_{(3.2)}^{Theorem1Unfold}$, and $4_3^{Theorem1Unfold}$ in the composite program. The point $3_{(3.2)}^{Axiom2}$, will have as successor $4_{(3.2)}^{Axiom2}$, which itself will have as successor the point (3.2), but the corresponding transition will be linked to the joint crossing of the transition leading from $4_{(3.2)}^{Theorem1Unfold}$, to this same point (3.2), because this transition is a "join". Hence a manner of representing at the same time graphically and in the SMIL language this composite program is to consider that a program point may have a certain number of transition cases, each being unique (this is always the case in a sequential program) or multiple (this can be the case in a composite program). Likewise, several transitions can reach a program point, each able to be unique (this is always the case in a sequential program and corresponds to the SMIL "fork") or multiple (this can be the case in a composite program, and corresponds to the SMIL "join"). However, this is not the only perspective. In this instance, the intermediary steps (and parallel or concurrent) may also be considered, for example, as sub-programs. This is not determining here, as in all cases the composition can be considered, whether it be explicitly developed or not as a program in its own right, with a finite number of points and transition types, also leading to a finite number of verifications and/or proof obligations.

When more than two programs are used in a composition a simple form is not always reached (as all programs do not synchronize at the same time), but here again generalization can be done by composing iteratively: in order to compose three programs, the two first ones are composed, one obtains a graph of the type of the previous two, then one identifies the synchronization points of the first composed one with the third program, and so on and so forth. Such composed ones will not be illustrated here, as that would complicate the presentation of claims for nothing. In any case, whatever way is used for building such compositions and whatever way is used for representing such composite programs, the simple concepts of (finite number of) points, single or multiple successors, or predecessors, are usually a good vehicle for implementing the embodiments described herein.

Of course, the possibility still exists of representing the parallel and concurrent execution by its different possible interleavings and come down to a purely sequential program, but it is both less efficient in terms of processing and especially here it generates a troublesome complexity for the presentation, unless not all interleavings are used but representative ones as will be briefly discussed in the sequel. In any cases the present invention does not suppose a particular execution model, and the two execution models. Sequential by interleaving and or traces represented by partial orders both work (with different levels of complexity).

2.2 Propagation of Congruences

Now, certain properties are going to be proven on the composite program, i.e. the so-called correspondence program. Here, an automatic strategy is going to be applied which consists in generating, then propagating, invariants, which come in the form of a conjunction of congruences (hence a relationship of equivalence). It is an example that is obviously not limiting. It can be supposed that the variables of each of the two programs are renamed in order to avoid variable name conflicts between the programs used in the composition. It has been decided to use index "t" for the variables of the first program and index "a" for that of the second one. In (1.2) $x_t=x_a$ and $e_t=e_a$, which results from the operation of launching the second program based on the other one's values. The rest is a simple algorithm of fixed point: By parsing the two parallel branches which lead to (3.2) it is obtained $x_t=x_a$, $e_t=e_a$ and $f_t=f_a$ or ($g_t=f_a$). Proceeding like so (congruence closure), taking note that in the case of loop back on an already computed point, the weakest congruences must be taken. This processing is repeated until a fixed point is obtained. For all the points for which no program has terminated its execution (that is to say, nor "true", nor "error" for any of the two programs) one has at least $f_t=f_a$ and $X_t=X_a$.

Once this fixed point has been reached, the pruning of branches may start. As it happens, there are three transitions leading to error for the first program: (3,2)→(« error,2), (3,2)→(error,true), and (3,true)→error.

If the two logic traces are taken which correspond to the two parallel paths that directly lead from (3.2) to (error, 2) and if congruence closure is applied to the result, the following is obtained:
[empty]removeFirst(−,f0,−);
[true] removeFirst(y0+,e0,e1+);
[true]removeFirst(z0+,f0,f1+);
[true](y0=z0);

Hence, these logic traces correspond to partial orders, which are here flattened. The presence of [empty]removeFirst (−,f0,−) and [true]removeFirst(z0+,f0,f1+) for the same value "f0", whereas removeFirst is deterministic show that the logic expression is a contradiction and that the branch is thus impossible (annotated by unsatisfactory logic expressions). Intuitively, knowing that the synchronization makes it possible to make the value of "f" and "g" evolve at the same time and in the same manner (and hence preserve the congruence), the theorem to be proven cannot meet a stack end "f" whereas the axiom itself can continue (without encountering this stack end at this location).

The same technique applied to (3.2)→(error, true), also leads to a trivial impossibility of the branch:
empty]removeFirst(−,f0,−);
[empty]removeFirst(−+,e0,−);
[true]removeFirst(x0+,f0,f1+);
[true](x0=x0);
[empty]removeFirst(−,f1,−);

Intuitively Theorem1Unfold arrives at the end of the stack "f", whereas it has still an element (that is precisely the sought element).

Figure 6:
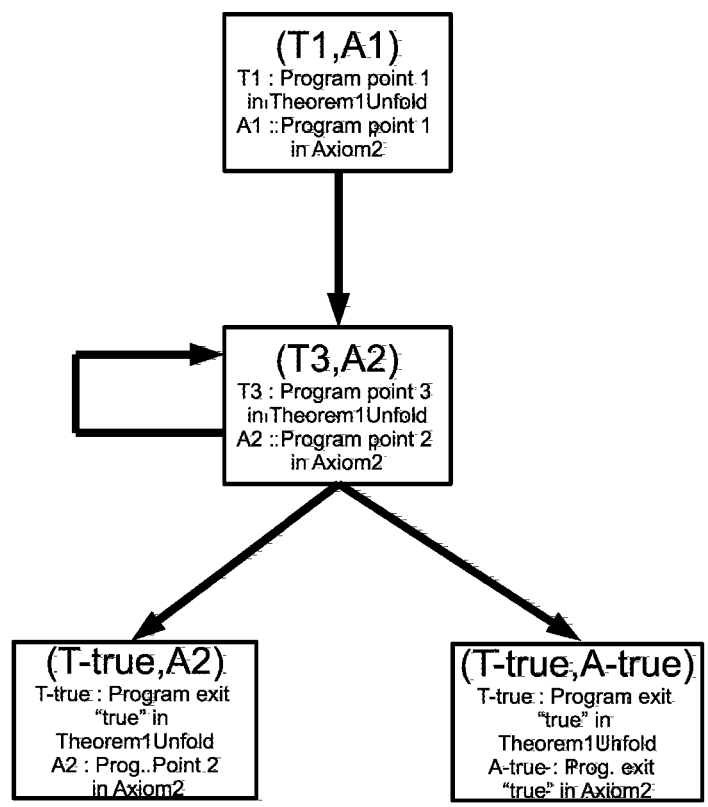
FIG. 6 is a flowchart of the same combination as FIG. 5 after suppressing impossible branches.

By applying the same research of impossibility to the transition (3.2)→(3,true), the element removed from "f" is found to be different from "x", while this element is equal to the element removed in the axiom which itself is, according to the axiom, equal to the sought element "x0". The suppression of this branch consequently removes all the following sub-tree/graph, which thus becomes unattainable. FIG. 6 depicts the result obtained after pruning While having composed the Theorem1Unfold program with Axiom2 without constraining the target program, Theorem1Unfold (all its executions exist in the compound), all the branches of the target program are successfully pruned which corresponded to the transition of 3 towards "error", which was precisely the transition sought to be eliminated. Hence, the theorem has been proven (it was the only transition to be proven in this theorem). Here, it has been used an implicit sufficiency relationship between the target program and the correspondence program: in order to be able to demonstrate the impossibility of the transition of 3 towards "error" in the first program, it is sufficient to demonstrate that all the transitions (3,)→(error,) or 3→error are impossible, either upon the construction of the composite program, or in retrospect upon pruning the correspondence program, and/or by propagation of local properties (impossibilities or other). The composition hence makes it possible to either directly prove certain local properties or to establish sufficiency relationships between certain programs with the purpose of proving certain local properties later on by propagation. Here, sufficiency relationships are established between the target and the correspondence program. Furthermore, in this example it is seen that there can be several sets of conditions, since there are several manners of showing the impossibility, by proving, for example, the impossibility of an unavoidable branch such as (3.3)→(3, true), or by showing the impossibility of the sub-tree/sub-graph which contains it[1]. However, the composition may also make it possible to establish sufficiency relationships between the target and the second elementary program, i.e. Axiom2. If Axiom2 instead of being an axiom was a non yet proven lemma, with, for example, the branch of the false equality not yet proven impossible, the composition would give certain additional branches, such as, for example, the branch going from (3.2) to (error, error), which would add certain additional conditions to the already identified sufficiency relationships or could create new sufficiency relationships. Furthermore, before applying the transitive closure, one is made aware that one generally has a sufficiency relationship between the target program and the two others, that is to say, a set of sufficiency conditions for an impossibility of the target program may comprise impossibilities in the two programs (instead of only one).

Here one has a method in several distinct steps which succeed each other: a composition with synchronization making it possible to obtain a new program, the correspondence program, then identification of the logic sufficiency relationships, then propagation of impossibilities or more generally of local properties. However, it is not generally necessary or efficient to separate these steps so clearly. It is generally possible to apply, for example, in one single pass (path, congruence and pruning on the fly). In a certain manner, this comes down to constructing sufficiency relationships in order to use them, then deleting them on the fly. In practice, the steps of establishing a relationship of sufficiency, propagation and suppression of sufficiency relationships are skipped, thus the composition is used directly for the proof of local properties. By way of example, by regrouping the steps, it is worth noting immediately that the branch (3.2)→(3,true) is impossible and not only is it useless to construct but especially it is avoided to construct or consider the following sub-graph/sub-program, and the impossibilities of the first program are proven on the fly without even having to identify the sufficiency relationships. The fact of not placing in the program Axiom2 the branches already proven impossible, also amounts to shunting certain of these steps (creation of sufficiency relationship, propagation, suppression).

Stronger synchronization constraints can be chosen, for example, by imposing and expressing the equality of values "f" and "g", upon synchronization instead of only using, as has been done here, structural synchronizations which do not take into account the value of the variables and can thus synchronize points irrespective of their values (a synchronization with data exchange in a parallel composition of the program is an example of such a stronger synchronization, that is to say, the value is given by one of the processes, and received by the other, such that the variables, that in output and that in input have the same value during the synchronization). In a certain manner, that would have led to presumably imposing what has been obtained a posteriori as consequence: similar proof obligations would have been obtained for the non-constraint property rather than for the pruning. This could have lead to more simple intermediate structures. Here, and in the mentioned alternatives, the technique may be rendered semi-automatic, that is to say, all that had to be done was choose the axiom to apply and the synchronization points and mechanisms. However, the ability to go further in the automation can be done by having a set of predefined synchronization strategies. For example, a very general strategy which could have been used here is the strategy which consists in synchronizing such as to keep the greatest coherence possible in the processing of data streams obtained in the different parallel branches. In the theorem, there is a data stream, corresponding to "f" which becomes "g" then evolves by applying "removeFirst" step by step. This data stream is easily found in the axiom once the axiom parameters have been instantiated. Typically, this consists in synchronizing the executions of "addLast" and "removeFirst" on both sides, which here would give a comparable synchronization (with slightly more synchronization points, but by avoiding the user having to propose synchronization points himself/herself, and hence reach a greater automation still).

As for the choice of axioms to be applied and the instantiation of the parameters, it may be obtained a certain (partial) automation by transposing rather naturally the usual techniques used by the more classic provers to select and apply certain axioms in a systematic manner.

In the case where no synchronization strategy is applicable, the tool may be guided by indicating synchronization principles (synchronization points or transitions, compatibilities or incompatibilities, cases to foresee) and defining at the worst one by one each of the synchronizations (there is a finite number, since the number of program points is finite for each program used for the composition, the number of programs is also finite and the synchronizations are possible, which may be represented by tuples of program points is thus too).

Here, it has been supposed that the program obtained by composition of two or several parallel programs synchronizing at points describes behaviors corresponding to partial orders such as traces. But, it could have just as well been supposed that the traces of such a program were all the possible interleavings, and thus come down to purely sequential programs for the composite program, that is to say, for the correspondence program. It would have obtained the same results but with greater combinatorics (particularly potential explosion of the number of states and transitions of the composite program). Briefly described, in an example in the sequel of the document, an intermediary solution which would consist in using the sequential program which acknowledges particular interleavings but representing the partial order corresponding to the composition, that is to say, for the needs of the invention it is not general to consider all the interleavings, but only some (one in general) of the representative interleavings for each parallel trace, or for each equivalence class of traces by interleavings.

With the purpose of illustrating both the use of a program to describe a coherence relationship and the generation of sufficiency relationships, a new proof of Theorem1Unfold is considered, where a new lemma is introduced:

```
Program LemmaAxiom2
[found :true]
{
        addLast(x,e,f+) ;
        while
        {
2 :         [empty :exit]removeFirst(y+,e,e+) ;
3 :         [empty :error]removeFirst(z+,f,f+) ;
4 :         [false:error](y=z) ;
4.1 :       [true:found](x=y) ;
        }
5 :     [empty :error]removeFirst(z+,f,f+) ;
6 :     [false:error](x=z) ; false)
7 :     [true:error,empty :true]removeFirst(z+,f,f+) ;
}
```

This program is very similar to the program Axiom2. Basically, the main difference is that it allows for a premature exit when the element "x" is this found in the first part of the search (typically because "x" was already present in the sequence "e"). This lemma has not yet been proven, even if this can be easily done using Axiom2. This means that the impossible branches (i.e. the ones leading to "error") still exist as they have not yet been pruned. Now, suppose some coherence properties between two programs Theorem1Unfold and LemmaAxiom2 are expressed. At this stage of the proof, the impossible branches are still present. Here are, by way of example, two coherence properties that can be expressed:

Coherence 1: the program points correspond with each other according to the graph: {(1,2), (3,2), (true,true), (error,error) }, with some coherence on the data of the points in correspondence: For example, when one of the programs exits by "true" the other does too, and the values of "g" of Theorem1Unfold are equal to values "f" of LemmaAxiom2 in these correspondences; The same coherence of values can, however, be expressed at each of the correspondences between the two programs (that is to say, not only upon exit). This informal description describes well a correspondence relationship between the execution traces of the two programs on the one hand, the states of Theorem1Unfold corresponding to the passage at points 1, 3, true, and error, and the states corresponding to the passages at points 2, "true" and "error" of LemmaAxiom2, on the other hand. However, the third program that would be obtained (1) as the composition of the two programs by using the same synchronizations as those previously used, then (2) by simplification by pruning while propagating the congruences is precisely a program which expresses this coherence that has just been informally expressed here. Thus, a program has been described, by composition here, which expresses the sought coherence between the two Theorem1Unfold and LemmaAxiom2 programs, and which by construction, is verified. This program, which is again an example of correspondence program for the two others, allows here to obviously identify sufficiency relationships, by identifying for each impossible transition of Theorem1Unfold the impossible transitions in correspondence in LemmaAxiom2. The previous proof of Theorem1Unfold was doing the same, with Axiom2 instead of LemmaAxiom2, but this was leading directly to pruning of impossible transitions in Theorem1Unfold as impossible transitions of Axiom2 were already discharged (and thus pruned) by definition. Furthermore, congruence not been propagated and pruned the correspondence program, a similar process would have resulted in identifying sufficiency relationship also pointing to transitions of correspondence program (i.e. the one not pruned here). This, of course, would not be very efficient but is only mentioned here to illustrate again the fact that sufficiency can range not only on the elementary programs but also on the correspondence programs. Here, the correspondence program is both obtained mechanically and parallel, but it is quite easy to imagine very similar examples were one or both of these particularities would be released. A sequential correspondence program featuring the representative complete orders could be used, for example, and this program could be provided explicitly instead of being computed, basically by merging the two programs into one featuring compatible execution. Details are not provided here. Also, the target program doesn't need to be one of the elementary programs. Obviously considering Theorem1 program as the target instead of Therem1Unfold allows the reworking of all previous examples to achieve this. Refinement relations used a way of showing that the implemented program would be another obvious example.

Coherence 2: a coherence can also be expressed only putting at stake the entry points of the two programs and the exit points. In particular, intuitively the coherence that is sought to be expressed here is that the two programs, if provided with the same entries, always both exit by same-label exits (that is to say, true or error), and furthermore with the same values. This does not make much sense here as error exit are meant to be impossible anyway, but it is easily to imagine similar programs with multiple valid output. In this instance, this coherence property corresponds to a form of refinement relationship and it is sought to be expressed using a program (in this instance also the correspondence program). This correspondence program can in fact be described as a simple sequential program. In fact, if variables are first renamed appropriately of one of the elementary programs so as to match corresponding variables of the other one, the correspondence program is LemmaAxiom2 himself 2.3 New Example of Composition with Synchronization In order to prove Theorem2 the exact same technique can be used. The composition is illustrated with several programs (instead of only one), and simplification is illustrated on the fly during the construction of the composite program. Typically, the Theorem2Unfold program, which is an unfolded version of Theorem2, will be composed with two other programs without constraining the first program. Theorem2Unfold is an unfolded version (and equivalent) of the theorem, in which the second instance of "member" has been unfolded.

Upon the "launching" of the program, that is to say just before the "addLast" call, a program is launched in parallel (typically by a "fork"), namely LemmaUnfold defined hereinafter. This program is instantiated with values "x" and "e" in this point (they are those which are provided in entry of the first program). This parallel launching is parameterized in the same manner as carried out before by synchronization points.

Figure 7:
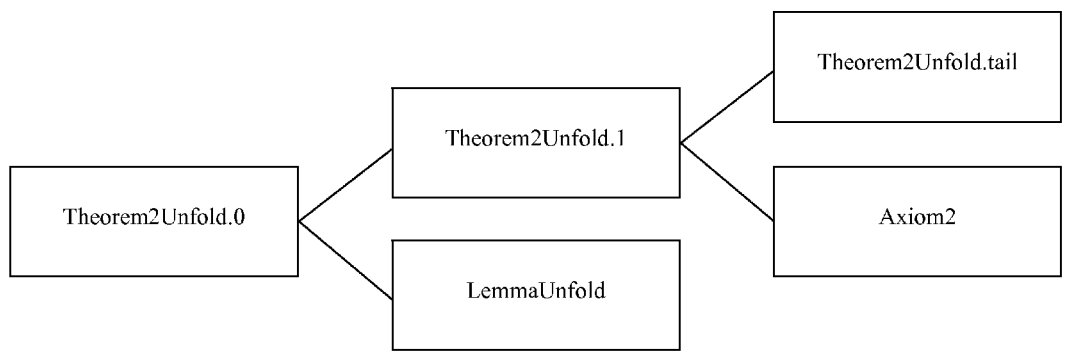
FIG. 7 is a flowchart of combination of three programs.

These parameters will be specified further on. In the following step of the Theorem2Unfold program, that is to say just after the "addLast" call, a second program is launched in parallel, that is to say, an instance of Axiom2 this time. This second launching is also carried out with synchronization parameters that will be specified further on. The LemmaUnfold program is obtained by unfolding the following proposition of which the proof is not detailed:
member(x,e)=>member(x,e);

FIG. 7 represents the call logic and putting in parallel of the three programs constituting the composition. Only the initial "forks" are represented here, by subsequent synchronizations.

As for synchronization parameters, used during parallel launchings of LemmaUnfold and Axiom2, they are of the same type as before. A loose synchronization automatically obtained by considering as synchronization points: the starts of the both programs, the starts of the loop and the various program exits. These synchronizations are here by definition done two by two, first between Theorem2Unfold and LemmaUnfold and than between Theorem2Unfold and Axiom2 (that is to say, lemmaUnfold and Axiom2 will not synchronize together). In order to simplify, these synchronization points will respectively be called, t-0, t-loop, t-true and t-false, for the program Theorem2Unfold, and 1-0, 1-loop, 1-true, for LemmaUnfold and a0, a-loop, a-true for Axiom2. Unlike the previous example, a single pass is used, thus making it possible to prevent the creation of useless branches and sub-trees and hence simplifying the construction.

If the start of the program (t-0,1-0) is considered, there are two programs which start in parallel, the first Theorem2Unfold will either pass by the "false" branch of the first instance of "member", and terminate by the exit "t-true", or will synchronize with the other program and go until the entry of the loop "t-loop", where it will await synchronization. The other program, LemmaUnfold, will do the same, either take the "false" branch of "member" and exit by "1-true", or go to the entry, "1-loop" of the LemmaUnfold loop. The third program, if it launched will go to "a-loop" in order to synchronize with the two others.

In theory, there is thus four combinations, except that two are incompatible (the two instances of "member" are applied on congruent values, and hence take exactly the same branches and generate results which are also congruent). Finally, there are only two possibilities (that is to say, two transitions), the immediate exits of the two parallel programs (i.e. both leading to (t-true, 1-true)), and the synchronization of the three programs on their starts of respective loops, namely (t-loop, 1-loop, a-loop). In the second case, it results in a transition of (t-0, 1-0) towards (t-loop, 1-loop, a-loop) knowing that this transition represents a partial order more complex than two (or n) programs advancing in parallel and joining in (t-loop, 1-loop, a-loop). To this transition, corresponds the partial order where the start point (t-0, 1-0) is connected (in the direction of increasing time), on one side directly to (t-loop, 1-loop, a-loop) by the branch corresponding to the advance in the Lemma program (from 1-0 to 1-loop), and on the other (t-1, a-0) which corresponds to the advance in the Theorem2Unfold program from t-0 to t-1 (with launching of the axiom, whence a-0).

This branch separates into two branches, which join at the same point (t-loop, 1-loop, a-loop), one corresponding to the advance in Theorem2Unfold up to t-loop, the other to the advance in the Axiom2 program up to a-loop. By advancing along these branches (by expressing the corresponding logic traces), three congruences are obtained, $x_t=x_a$, $e_t=e_a$ and $f_t=f_a$, modulo obviously the probable renaming of variables. Then, there is the transition of (t-loop, 1-loop, a-loop) towards itself which still preserves this invariant, the transition of (t-loop, 1-loop,a-loop) towards (t-true,1-true,aloop) that is not extended (because the first program is terminated). All the other potential transitions (combinatorics to be considered) are impossible. Those going towards (_,1-false,_) are impossible as this transition is impossible for the second program. Those going towards (t-false,_,_) are impossible as they are contradictory, except for the case of (t-false,1-false,_) which is impossible as previously explained. Those going towards (_,_,a-true) are impossible as they are contradictory, except for the case of (t-false,_,a-true) which is impossible, as previously explained.

Figure 8:
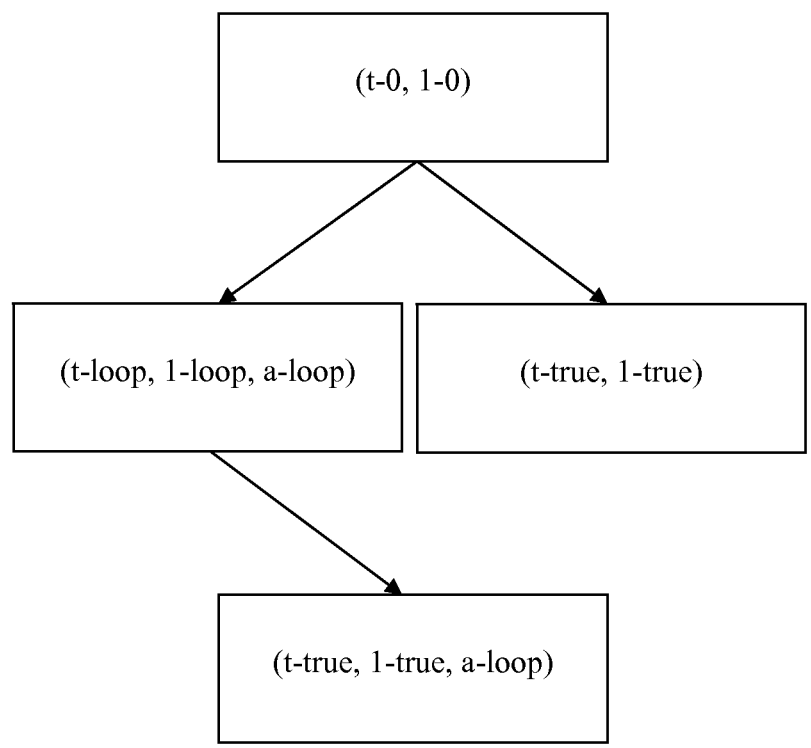
FIG. 8 is a flowchart of constraints of the same combination as FIG. 7 after suppressing impossible branches.

This pruned structure, depicted in FIG. 8, by construction thus clearly shows that the theorem is proven, as it removes all transitions going from t-loop towards t-false.

It can also be incidentally seen that only one part of the axiom is used (there is never any way out of the loop, the rest of the axiom program being useless here). In the previous example it was the case but less visible (only the last instruction was useless).

2.4 Program Transformation

The Theorem1Unfold program is now considered for which a new incomplete proof done with the purpose of illustrating certain claims differently is presented. First, a few elementary transformations are applied (here elementary transformations are used, but an equipment would typically make it possible to use more powerful and less numerous transformations). Here, the idea is that the tool establishes at each step the sufficiency relationships between the modified program and the start program, so that finally it is sufficient to prove the obtained program, Theorem1UnfoldModn in order to deduce the security of the initial program, Theorem1, in this instance. However, these steps not being of interest here, because such mechanisms have already been illustrated above, are presented very superficially, just for the matter of completeness of the proof example.

First of all, an instance of the "removeFirst" predicate is inserted just before the point 3. This new instance will concern a data of "seq" type, which is initialized by the value of variable "f" at the exit of the first instruction. In fact, in order not to modify the variables of the initial program, that is to say, the variable "f" here, and with the purpose of simplifying the statement, an additional variable "h" is used that is initialized by means of a copy instruction inserted just after point 2.

```
Program Theorem1Unfold Mod1
1 : addLast(x,e,f+) ;
[true:error,found :true]
{
2 :     g :=f ;
        h :=e ;         //new
        while
        {
                [*:true] removeFirst(z+,h,h+) ;    // new
3 :             [empty :error]removeFirst(y+,g,g+) ;
4 :             [true:found](x=y) ;
        }
}
```

As far as each one of the predicates inserted is "total" (that is to say without pre-condition) and that each one of the predicates inserted branches all its exit cases towards the point before which it has been inserted, and thus without modifying any variable of the initial program, this transformation preserves the initial program, and in all cases the properties expressed here by means of declarations of impossible transitions.

In a certain manner, if the instructions added in the second program are considered to be invisible and with no impact on the program execution time, or as if it is the case here interest is not in the program execution time but only in its functionality, the two programs (i.e. the one before transformation, and the one after transformation) are equivalent. Thus, any transition of the first program is either found to be identical in the second program, or corresponds in a trivial manner to one or several transitions (or sub-graph) in the second. Thus, in order to prove the impossibility of a particular transition in the initial program, it is sufficient to establish the impossibility of the corresponding transitions in the thus, modified program. In order to resume it has hence been established a relationship between the Theorem1Unfold and Theorem1UnfoldMod1 programs, then established that the proof of impossibility of certain transitions of the second would make it possible to deduce the impossibility of a transition that is declared to be impossible in the first. Here, and one has a simple solution in which the impossible transitions correspond to each other one by one, and even more precisely in which there is only one transition declared to be impossible in each program with a very simple correspondence. In order to prove the impossibility of a transition of the second program it is sufficient to prove the transition impossibility of the other one. Hence, it is a sufficiency relationship as defined beforehand. Here the sufficiency relationship only associates one impossibility to be proven in the first program in order to prove the target one, in the second program, but the number of associated impossibilities to discharge in the second program, could be multiple as well, or even be taken in more than one program, as was, for example, illustrated in the sections on coherence relations.

It is now described a new step obtained by modifying in the last program the branching of the "empty" case of the inserted "removeFirst" predicate, by redirecting it towards a partial copy of the program, more precisely by redirecting it towards a copy of the program loop as described hereinafter.

```
Program Theorem1Unfold Mod2
1 : addLast(x,e,f+);
[true:error,found :true]
{
2:      g :=f;
        h :=e;
        while
        {
3-1 :        [empty:exit] removeFirst(z+,h,h+); // branching modified
3 :          [empty :error]removeFirst(y+,g,g+);
4 :          [true:found](x=y);
        }
        while                                    // duplicated
        {                                        // duplicated
3a-1 :       [*:true] removeFirst(z+,h,h+);      // duplicated
3a :         [empty :error]removeFirst(y+,g,g+); // duplicated
4 a:         [true:found](x=y);                  // duplicated
        }                                        // duplicated
}
```

This type of transformation is very easily achieved with a tool that can guarantee and establish by construction the correspondence of the properties, if need be by requesting the discharge of a few proof obligations. Here, however, two impossible transitions correspond in Theorem1UnfoldMod2 to the only impossible transition of Theorem1UnfoldMod1, and there is the need to prove the impossibility of the two in order to deduce, thanks to this correspondence, the impossibility of that of the first program.

Thus, with these relationships between programs are constituted, a network of programs which will make it possible, by proving one of the programs or rather some of its properties to deduce by following the network from node to node, and by propagating the satisfaction of the properties in accordance with the available correspondences, the properties of other programs until arriving here at the proof of the impossibility property of the Theorem1Unfold program, here in this instance of the proof of impossibility of one of its transitions (that corresponding to the program exit without having found the sought element). Here, a few similar steps are skipped in order to arrive at the following new lemma program:

```
Program Theorem1Unfold Modn
1 : addLast(x,e,f+);
[true:error,found :true]
{
2:       g :=f;
2.1 :    h :=e;
         while
         {
3-1 :         [empty:exit] removeFirst(z+,h,h+);
3 :           [empty :error]removeFirst(y+,g,g+);
4 :           [true:found](x=y);
         }
3aa :    [empty :error]removeFirst(y+,g,g+);
4aa:     [true:found,false :error](x=y);
}
```

Here, the second loop has been particularly unfolded once (that is to say, this unfolding here consists in exiting and inserting just before the entry of the loop a first passage in the loop, that is to say, the loop only typically serving for the possible second passage and those following). For the sake of simplicity, the second instance of the inserted removeFirst predicate has been removed as it is now useless in this part of the program. The reasons that make it possible to remove it are similar to those that made it possible to add it. It has then been declared in 4aa that the equality could not be false which in reality comes down to expressing that the branching towards the unfolded loop (that is to say, the following passages are impossible). This has made it possible to remove this dead branch (and hence to delete this unfolded loop, this is why ultimately the loop has been replaced by a single passage in the loop body). This transformation is trivial in itself, but it adds a constraint which has to be proven, that is to say, that the new branch that is declared to be impossible is in fact just that. It is the main proof obligation pertaining to the transformations achieved here, all the rest being able to be verified statically and simply by the tool. In fact, this proof obligation is directly expressed in the resulting program by adding an impossible transition, and there is no need to prove it separately. The correspondences between Theorem1Unfold2 are quite direct and are managed by the tool implementing the invention. Here, typically there are two correspondences: (1) the first impossible branch of the first program corresponds to the first of the second (in order to prove the first "error" branch of instruction 3 of the first program, it is sufficient to prove the second "error" branch of instruction 3 of the first program), and (2) the second impossible branch of the first program corresponds to the last two impossible branches of the second (in order to prove the first instruction 3a, it is sufficient to prove the two last ones, 3aa and 4aa). In this instance, it consisting of this last correspondence, it corresponds to the following intuition: in order to prove that the loop (the second loop of Theorem1Unfold2, in this instance) cannot exit by the "empty" branch of "removeFirst" it is sufficient to prove that it cannot do so during the first passage, and that there is no other passage as the following equality cannot take the "false" branch (the equality is always true). Obviously, a tool which would implement a less precise version of the correspondences, for example, the one only establishing one correspondence here, the one indicating that the proof of the three impossibilities is necessary for each one, where the set of impossibilities of the first program, would be despite everything a valid implementation of the invention.

What remains important is the correspondence that can be obtained directly or by composition of the previous ones by following the program network, between the program of interest Theorem1Unfold and Theorem1Unfoldn (or any other program making it possible to prove by propagation the proof of certain of its properties). In this instance, the correspondence between these two programs would establish that, to prove the impossibility of the branch leading to "error" in the Theorem1Unfold program (or even rather Theorem1), it is sufficient considering the network of lemma programs to prove the impossibility of the three branches declared as impossible in the Theorem1UnfoldModn program.

Ultimately, it is required here to extend the network in order to establish this same relationship with the Axiom2 axiom, such that the proof of the three impossible branches of the first return to those of certain impossible branches of Axiom2, a proof in this immediate instance by hypothesis in the case of an axiom. The abstraction/renaming presented hereinafter will be used, in order to achieve these last steps.

2.5 Abstraction/Renaming

When a program is described consideration may want to be given that certain variables, and/or certain states (the term state is used here in the sense "states associated with a certain program point"), are invisible. A variable may particularly be considered as being globally invisible or invisible at certain places (that is to say on certain states, that is to say, program points). Another interesting mechanism is the possibility of renaming the variables contextually. In order to characterize an abstraction, a renaming or a combination of both, it is sufficient, for example, to give a function which will be called abstraction function which associates with each variable of each state (or more precisely each variable of each program point, that is to say, of each node in the graph of the intermediary representation), either, the new name of the variable (itself in the case where there is neither any renaming nor abstraction) or a characteristic value dedicated for this purpose, let one say $\bot$, if the variable must be abstract (made invisible).

$$AbsRen:Vars \times ProgramPoints \rightarrow Vars \cup \{\bot\}$$

Given a program and a corresponding AbsRen abstraction function, it will be associated to it abstract execution traces (respectively abstract complete logic traces, or abstract logic prefixes according to the chosen semantics) which will have been transformed by application of the abstraction function by transforming each element either by making it disappear or by renaming it or making certain of its variables disappear, according to the value associated by the AbsRen function with the couple constituted by the variables of the environment constituted by the element (respectively by the variables associated with the element).

It is worth noting that for a given program the Vars and ProgramPoints sets are finite. In the SM language (and SMIL intermediate language) it is considered, that the set of known variables in a program point is not necessarily the same at each program point, and these sets are computed by program analysis, such that the abstraction function only needs to be defined on the pertinent variables at each point.

It is also worth noting that if the trace of the program point is kept in the execution trace of a program (for example, by having a programCounter variable which stores the current program point, that is to say the name of the corresponding node), one may easily define the abstraction function in a coherent manner on the logic traces of the program.

Use in Modelization:

Such an abstraction function can have many uses in modelization or program proof. In general, once a program has been written several views for a same program (each corresponding to a different point of view, for example, and to a different abstraction) can be considered. By way of example, if only the state of the start of a program and its exit state are considered, one obtains the rather classic vision of a program represented by means of a binary relationship between its entry and its exit variables.

The abstraction also makes it possible to use programs or more generally recursive or iterative structures as modelization tool without having to worry about the possible redundant or useless information that can be placed thereto, nor even worry about the particular form used. In certain cases, renaming make it possible to abstract the differences between variables, particularly when a renaming makes it possible to transform two different variables into a single one.

Generally, one has the choice in the programs which makes it possible to describe an object or a given concept, and it is not a question of letting one become disturbed by the search of the best model. For that, one will have a mechanism that will be called the abstraction and which makes it possible to compute and associate a trace based on another that is generally richer. Typically an abstraction is a function, which makes it possible to transform a logic trace without taking into account the values of the logic variables used, if they are instantiated, and without taking into account if possible the encountered annotations. It is defined on the program itself, but in a certain manner the abstraction is applied on the traces of a program. In as far as it is possible to write a program, which has the traces of another program after abstraction/and or renaming, or to compare two programs provided with their abstractions and or respective renaming, the programs themselves are focused on here.

There are several ways to formalize or parameterize the abstraction or renaming notion that is introduced here. By way of example, the program point could not have been used as context information, but the program point signature (the list of known variables known in a program point, certain variables able to be without significant value and only characteristics of a program point). This makes it possible to process the abstraction applied to the traces with greater homogeneity.

The abstraction is a very general notion, which can be characterized in different manners. Here, the embodiment taken into account is to only describe one of its particular and restrictive forms. Here, the abstraction is an "abs" function defined based on a "characteristic function" which indicates is a variable is defined or not at a given program point. Applied to the corresponding program point and to its annotation, either it replaces the points of a start trace by points whereof the environment has been obtained by restriction of the start environment by the result of the characteristic function if it is a non-empty sub-set of the signature of the start point (or any other object making it possible to characterize such a set), or it makes this point disappear in the result curve in the opposite case (undefined function or referring to a particular distinctive value according to the conventions).

In doing so, it is considered that by definition the order relationship between the points of the result curve is that obtained by morphism. Hence, the abstraction is a function that establishes a morphism between the order relationships expressed in the start and end traces.

A program provided with one of its abstractions might itself be considered as a program. The points of this new program are the points, which remain visible (those that do not disappear, that is to say, those that are not made visible by the abstraction). The (cases of) possible transitions starting from a point are defined at least in an indirect manner through the combination of the abstraction function and the program fragments, which connect the corresponding visible points in the start program.

Use within the Scope of the Invention:

It has here been defined a rather basic abstraction relationship which only focuses on the states. In the same manner, more sophisticated abstractions may be introduced also particularly able to act on the transitions. For the sake of simplicity and brevity, one limits oneself here to this basic abstraction even thought this nevertheless complicates the presentation of the examples. Having such an abstraction function, it is shown here how to implement the present invention. Even here, by choosing a certain type of abstraction (for example, that presented here) there are typically several manners of implementing the invention.

Given two programs each provided with their abstraction, it can be decided to establish a relationship from one program towards the other is it is thought that the sets of abstract execution traces can be compared according to a certain graph (for example, the set of all or some abstract complete traces of the one can be compared, e.g., inclusion, equality, . . . with the set of certain of the abstract complete traces of the other). Here, in this instance, the relationship will be such that all the traces taking the branches declares as being impossible in one will be branches taking the impossible branches in the other, thus the proof of the impossibility in one (in this instance the multiple impossibility) of the programs will make it possible to deduce the impossibility in the other.

In the TheoremUnfoldModn program an abstraction which only retains points 1, 3-1, 3, 3aa, 4aa, true, error is defined (the exit point error is in fact kept, as useful, as long as the transitions leading thereto are not demonstrated as being impossible). The first abstraction may hence be written:

1: <x→x,e→e>
3-1: <h→e>
3: <g→f>
3aa: <g→fa>
4aa: <x→x,y→y>

For the sake of brevity, it is supposed that all the omitted correspondences are by default towards ⊥. Thus, for example, the point 2 which associates each of its variables, « x », « e », « f », to ⊥ is thus completely abstract, and the corresponding component of the abstraction function is implicit. The point 3-1 only mentions the transformation for "h" which means that the other variables are abstract in this point. The variable "fa" represents here the last value taken by "g" when the program does not exit prematurely after having found the value sought for: the program exits prematurely in the case where the value already existed in the start sequence, whereas in the other cases the programs only finds the sought value in last position, since it has just been added.

In Axiom2 the abstraction, which only retains 1, 2, 3, 5, 6, and « true » is defined. The renaming which makes it possible to only respectively keep variables <e, x> in 1, <f> in 3, <fa> in 3b, <x, y> in 4b, <fc> in 3c are carried out.

1: <x→x,e→e>
2: <e→e>
3: <f→f>
5: <f→fa>
6: <x→x,z→y>

Then it is proposed to place the two programs in correspondence and consequently their behavior with the purpose of proving the local properties of one based on those of the other. For this, we can either compose the two programs by using the defined abstraction as a way to express synchronization strategy, or prove by induction in a way that exploits some correspondence between the two programs. In the latter case, we typically do not need to explicitly build the program that express the correspondence (i.e. the so called correspondence program), but use it implicitly. Both cases can nevertheless be seen as illustrations of the same claims.

The first case is illustrated. The abstractions making certain program points disappear, the synchronization will be on the program points which remain visible, except for exit points which will be considered here as being visible and unchanged by the synchronization. More precisely two program points will be synchronized if and only if they are visible and are equal (their states, that is to say, their variable names and values are equal, no value being here considered in the case of exit points), and a visible point must be synchronized, except if the other program is terminated or terminates: is placed in a state based on which it has no more visible points. In this last case, the "live" program can continue its execution on its own without having to carry out any other synchronizations. By applying this composition strategy, which is only given here by way of illustration, the composite so-called correspondence program is obtained typically after some congruence propagation and pruning Looking at this correspondence program more closely, five groups of behaviors which correspond for the first program can be identified, i.e. Theorem1UnfoldModn: the program may (1) either exit on "error" starting from point 3, (2) or on "true" starting from point 3 (that is to say that, it is to be reminded that "found" is renamed "true"), (3) or on "error" starting from point 3aa, (4) or on "error" starting from point 4aa, (5) or on "true" starting from point 4aa.

The first case always corresponds in the composition obtained after simplification to a case where the program Axiom2 attempts to pass the transition leading it from point 3 to "error", transition which is known to be impossible. More precisely, when the first program arrives in 3, the Axiom2 program is also forced in 3 within the composition (that is to say, the composition is non constraining for the first program, and the only point of the composite program comprising point 3 of the first program is the synchronization point (3,3)). Furthermore, at these points the values of the states are the same and in particular the respective variables "g" and "f" of the two programs have respectively the same values. Thus, starting from (3,3) any transition from one towards « error » implies that of the other: the only two transitions starting from (3,3) are (3,3)→(4,4), (3,3)→(error,error) hence the transition towards "error" being proven (that is to say, supposed) in Axiom2 is thus, necessarily impossible too in Theorem1UnfoldModn (propagation of the impossibility property of Axiom2 towards Theorem1UnfoldModn).

The second case is that where the program Theorem1UnfoldModn does not have to parse the whole sequence to find the sought element. In this case, the composite program continues with the sole execution of Axiom2, which parses anyway the entire sequence until its last element. There is nothing to prove in this case anyway (no impossible branch or other local property). It is easy to see that the composition strategy used here could easily be improved by terminating the program for which the non constraint property is useless, here Axiom2, but this is not the purpose here.

The third case corresponds to an "error" case of the Axiom2 program starting from point 5, which is known as to be impossible, for reasons similar to the first case.

The fourth case corresponds to an "error" case of the Axiom2 program starting from point 4, which is known to be impossible, for reasons similar to the first case.

Figure 10:
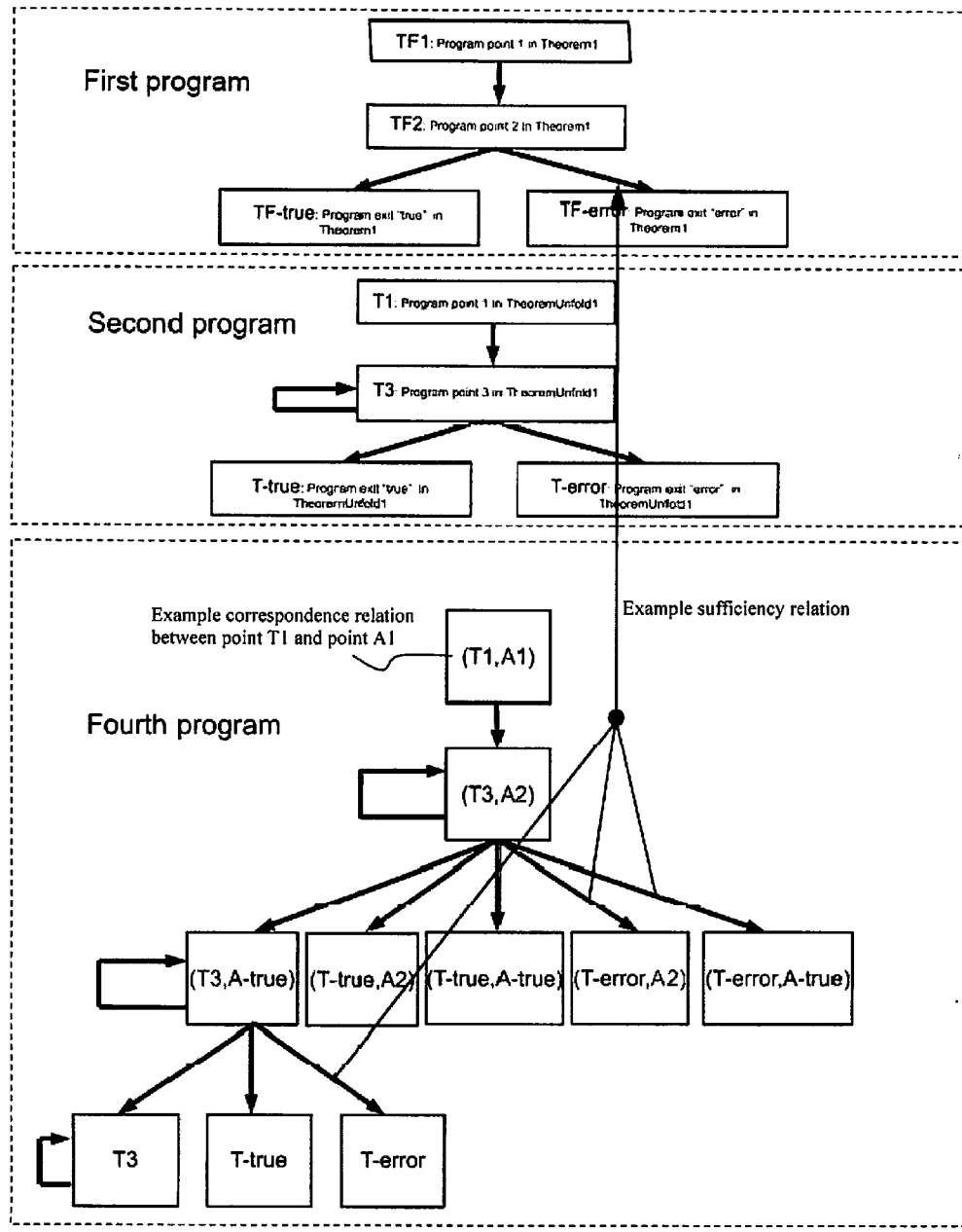
FIG. 10 is a flowchart of a method for securing a first program with a second program, a third program, and a fourth program, according to an embodiment.

Referring to FIG. 10, a flowchart of a method for securing a first program with a second program, a third program, and a fourth program, is depicted, according to an embodiment. In an embodiment, the first program is a target program, the second program is a representative program of the target program, the third program (not shown) is a lemma program, and the fourth program is a composition program. In a particular embodiment as described herein, the first program is Theorem1, the second program is Theorem1Unfold, the third program is Axiom2, and the fourth program is a composition of Theorem1Unfold and Axoim2, as in FIG. 5.

In an embodiment, the fourth program establishes a correspondence relation between, for example, T1 in the second program and A1 in the third program (but also many others). The sufficiency relation allows for the discharge of the proof of the first program (removal of the impossible branches).

Figure 11:
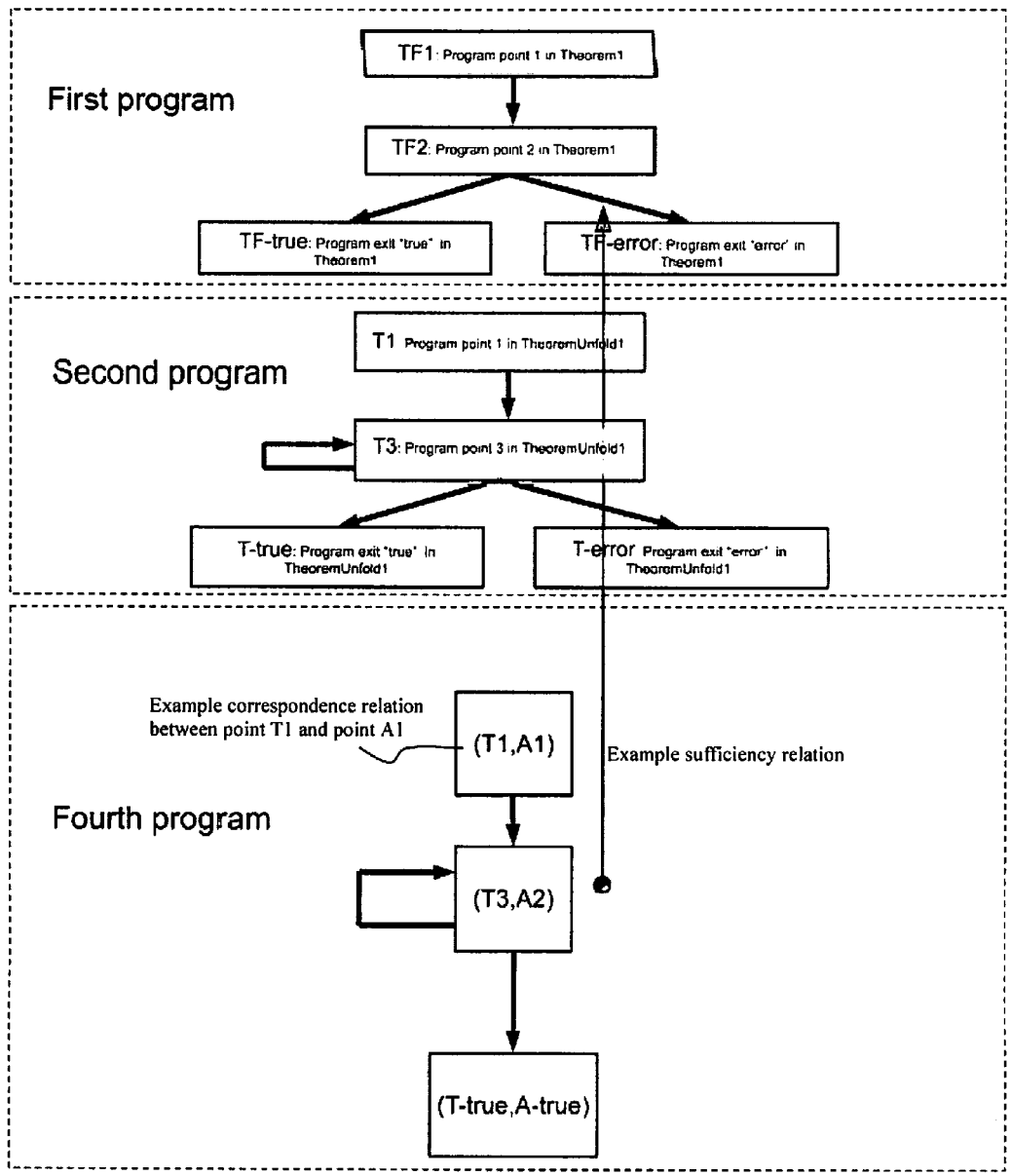
FIG. 11 is a flowchart of a method for securing a first program with a second program, a third program, and a fourth program, according to an embodiment.

Referring to FIG. 11, another embodiment of a method for securing a first program with a second program, a third program, and a fourth program, is depicted. The method for securing a first program is substantially similar to the method depicted in FIG. 10. However, in such an embodiment, the pruning of impossible branches has been done on the fly when constructing the fourth program. In other words, FIG. 10 illustrates a sufficiency relation is used such that once the three source properties have been proven, the proof of the target property is thus obtained. In FIG. 11, the source property is already proven during construction of the fourth program, and thus the sufficiency relation can be used to consider the target property as proven.

The fifth case corresponds to the situation where the sought element has not been found in the first part of the sequence, and where it is the last element of the new sequence that is the sought element. At this moment the Axiom2 program is inevitably passing from point 4 to point 5, and there is nothing particular to prove in this case anyway (no impossible branch, no other local property).

This is the idea that can be used to prove by induction. For achieving this, decomposition is used in cases corresponding to the points of the correspondence program (this can be done in various ways, one case per point of the correspondence program, or on case per point of one elementary program, typically the one to prove, and then on sub case per each corresponding point of the correspondence program:m. In practice, the correspondence program does not need to be constructed explicitly. This proof by induction is not displayed here.

Such a composition may also make it possible to establish sufficiency relationships. By considering, for example, that the Axiom2 program is a lemma that is not yet proven (and thus had still some non pruned impossible transitions), instead of being an axiom, the previous composition would not prove anything immediately, but would make it possible to create several sufficiency relationships which would lead by propagation to the same situation of proof once the impossible transitions of Axiom2 lemma were proven.

By way of additional illustration of the use of the abstraction/renaming, another use of the abstraction is described for the proof of the same theorem. In fact, Theorem1Unfold can be directly connected to Axiom2 by using one single lemma program. For example, the following Axiom2Theorem1program is considered:

```
addLast(x,e,g+) ; //tag1 : A (Axiom2), T (Theorem1)
f :=g ; // tag2 : T
while
{
    [empty :exit]removeFirst(y+,e,e+) ; // tag3 : A
    [empty :error]removeFirst(z+,f,f+) ; // tag4 : A, T
    [false:error](y=z) ; // tag5 : A
    [true:found](x=y) ; // tag6 : T
}
[empty :error]removeFirst(z+,f,f+) ; // tag7 : A, T
[false:error](x=z) ; // tag8 : A, T
[true:found](x=y) ; // tag9 : T
[true:error]removeFirst(z+,f,f+) ; // tag10 : A
}
```

It has been proposed to apply rather naturally two abstractions to this program, respectively $\alpha_1$ and $\alpha_2$ making it possible for the program to respectively have comparable behaviors to those of program Axiom2 and Theorem1Unfold (it is worth noting that it is useless to apply abstractions here to these two programs as has been done in the previous example, or to remain homogenous it is possible to apply identity abstractions, which rename each variable in itself). The two abstractions are not given explicitly here for the sake of brevity, but can be obtained very easily, as has been done previously. The comments provide informal indications of the points and instructions, which should be found in the axiom and/or in the theorem.

This association then makes it possible to apply the invention in order to propagate properties and thus carries out a verification step. More precisely, the transition which potentially makes Theorem1Unfold exit by the "error" label, is thus found to be associated with the sub-graph of Axiom2Theorem1 whereof the exits take the transitions declared as impossible. The latter can themselves be associated with impossible transitions of Axiom2.

Figure 9:
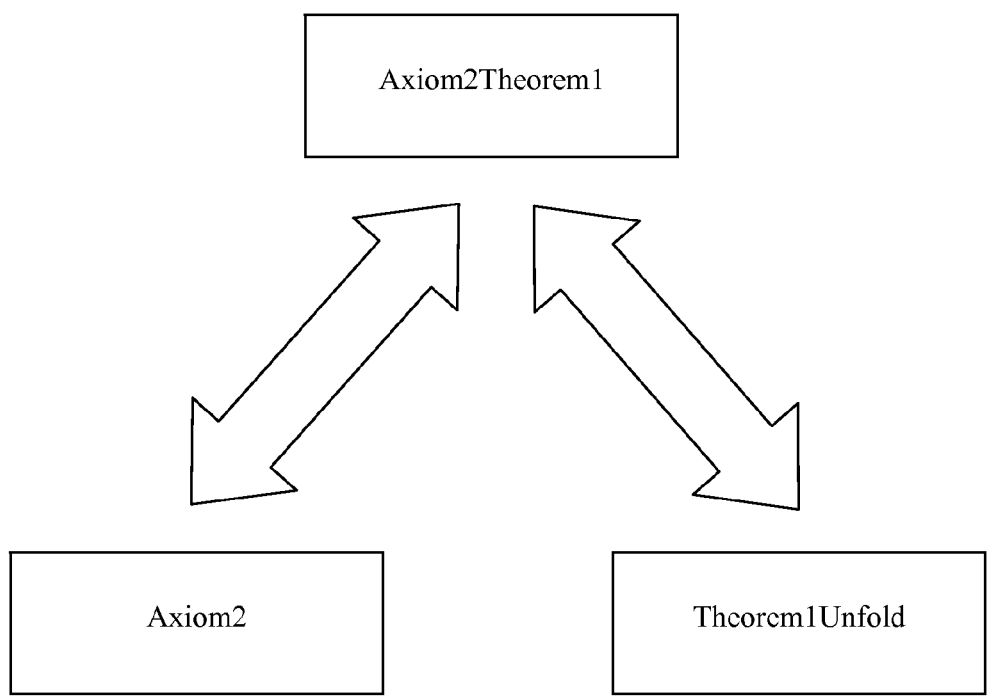
FIG. 9 is a network of three programs.

Thus, the abstraction applied twice has made it possible to create the network (or a sub-network) of three programs as represented in FIG. 9, wherein properties are propagated here (the impossibility to carry out a certain transition, or take a certain sub-graph) from the Axiom2 program towards Axiom2Theorem1 then from Axiom2Theorem1 towards Theorem1Unfold. In is worth noting here that in the two applications of the invention we are in the particular case where the correspondence program is one of the elementary ones.

For the last example of use of the invention, a more complex program has been exhibited (that is to say, Axiom2Theorem1). This program corresponds in a certain manner to a particular interleaving of the partial order that would be obtained by applying the previously illustrated composition. It also particularly makes it possible to illustrate particular (and sequential) interleavings which offer in terms of combinatorics the benefits of the partial orders while remaining on sequential models (with a total order).

Another perspective is to consider that each abstraction defines a new program extracted from Axiom2Theorem1, one that is very directly compared with Axiom2, the other with Theorem1Unfold. The last two comparisons able to be carried out using a trivial composition where all the program points are synchronized except for the program exits, which receive a particular processing making it possible to guarantee the non constraint property. The same vision could have been considered in the previous example: each abstraction applied to one of the programs (here the two abstractions are applied to the same program, in the previous case each is applied to a different program), defines a new program. These two programs are then compared using the trivial composition.

The abstraction allows, in a certain manner, to compare objects that are presumably incomparable directly (incomparable as their traces are in spaces of different natures, e.g., different naming conventions, variables or additional states, etc). Hence, in a certain manner, the abstraction makes it possible to offer a view of a program such that it can then be compared with another program, or at the abstract view of another program.

While the invention is amenable to various modifications and alternative forms, specifics thereof have been shown by way of example in the drawings and described in detail. It is understood, however, that the intention is not to limit the invention to the particular embodiments described. On the contrary, the intention is to cover all modifications, equivalents, and alternatives falling within the spirit and scope of the invention as defined by the appended claims.

The invention claimed is:

1. A method for securing a first program, referenced hereinafter as a target program with a second program, referenced hereinafter as a target representative program, a third program, referenced hereinafter as a lemma program, and a fourth program, referenced hereinafter as a composition program, each program comprising constitutive elements, said constitutive elements comprising a finite number of program points and evolution rules associated with the program points and defining the passage from one program point to another program point, and each program comprising a definition of a set of properties each property being associated with one or more of the constitutive elements of the program, said method comprising:
    constructing the composition program by defining at least one relation between at least one constitutive element of the target representative program and at least one constitutive element of the lemma program, said relation being named a correspondence relation; and
    exploiting the correspondence relation for establishing a relation between one property of the first program and at least one property of the lemma or composition program, said relation being named a "sufficiency relation" and being such that it creates an oriented relationship between one local property of a program, and one or more local properties of the same or another program such that the proof of the latter properties proves the first local property, or propagate the proof of said property to at least one property of the target program.

2. The method according to claim 1, wherein the target program is the target representative program or the composition program.

3. The method according to claim 1, wherein the composition program is the target representative program or the lemma program.

4. The method according to claim 1, wherein the composition program is constructed automatically by applying synchronization rules between the target representative program and the lemma program.

5. The method according to claim 1, wherein the method steps are implemented on a computer from a software product comprising software instructions executed on the computer.

6. A system for securing a first program, referenced hereinafter as a target program with a second program, referenced hereinafter as a target representative program, a third program, referenced hereinafter as a lemma program, and a fourth program, referenced hereinafter as a composition program, each program comprising constitutive elements, said constitutive elements comprising a finite number of program points and evolution rules associated with the program points and defining the passage from one program point to another program point, and each program comprising a definition of a set of properties each property being associated with one or more of the constitutive elements of the program, said system comprising:
    a program builder for constructing the fourth composition program by defining at least one relation between at least one constitutive element of the target representative program and at least one constitutive element of the lemma program, said relation being named a correspondence relation; and
    a prover exploiting the correspondence relation for establishing a relation between one property of the target program and said at least one property of the lemma or composition program, said relation being named a "sufficiency relation" and being such that it creates an oriented relationship between one local property of a program, and one or more local properties of the same or another program such that the proof of the latter properties proves the first local property, or for propagating the proof of said property to at least one property of the target program.

7. A method for securing a first program means with a second program means, a third program means and a fourth program means, each program means comprising constitutive elements, said constitutive elements comprising a finite number of program points and evolution rules associated with the program points and defining the passage from one program point to another program point, and each program means comprising a definition of a set of properties each property being associated with one or more of the constitutive elements of the program, said method comprising:
    constructing the fourth program means by defining at least one relation between at least one constitutive element of the second program means and at least one constitutive element of the third program means, said relation being named a correspondence relation; and
    exploiting the correspondence relation for establishing a relation between one property of the first program means and at least one property of the third or fourth program means, said relation being named a "sufficiency relation" and being such that it creates an oriented relationship between one local property of a program, and one or more local properties of the same or another program such that the proof of the latter properties proves the first local property, or propagate the proof of said property to at least one property of the first program means.

8. The method according to claim 7, wherein the first program means is the second program means or the fourth program means.

9. The method according to claim 7, wherein the fourth program means is the second program means or the third program means.

10. The method according to claim 7, wherein the fourth program means is constructed automatically by applying synchronization rules between the second program means and the third program means.

11. The method according to claim 7, wherein the method steps are implemented on a computer from a software product comprising software instructions executed on the computer.

* * * * *